United States Patent
Benson et al.

(10) Patent No.: US 6,540,367 B1
(45) Date of Patent: Apr. 1, 2003

(54) STRUCTURED SURFACE ARTICLES CONTAINING GEOMETRIC STRUCTURES WITH COMPOUND FACES AND METHODS FOR MAKING SAME

(75) Inventors: Gerald M. Benson, Woodbury, MN (US); Kenneth L. Smith, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/515,120

(22) Filed: Feb. 25, 2000

Related U.S. Application Data

(63) Continuation-in-part of application No. PCT/US99/07618, filed on Apr. 7, 1999.

(51) Int. Cl.[7] .............................................. G02B 5/124
(52) U.S. Cl. .................. 359/530; 359/529; 359/515; 428/156; 428/161; 428/172
(58) Field of Search ................. 359/530, 529, 359/515; 428/156, 161, 172

(56) References Cited

U.S. PATENT DOCUMENTS

| | | | |
|---|---|---|---|
| 1,194,294 A | 8/1916 | Johanson | |
| 1,591,572 A | 7/1926 | Stimson | |
| 3,684,348 A | 8/1972 | Rowland | 350/103 |
| 3,712,706 A | 1/1973 | Stamm | 350/103 |
| 3,741,623 A | 6/1973 | Mihalik | 350/103 |
| 3,924,928 A | 12/1975 | Trimble | 350/99 |
| 3,926,402 A | 12/1975 | Heenan | 249/117 |
| 4,066,236 A | 1/1978 | Lindner | 249/160 |
| 4,066,331 A | 1/1978 | Lindner | 350/103 |

(List continued on next page.)

FOREIGN PATENT DOCUMENTS

| | | | |
|---|---|---|---|
| DE | 44 29 683 C1 | 3/1996 | ........... B23P/13/00 |
| EP | 0 887 665 | 12/1998 | ........... G02B/5/124 |
| JP | 57138510 | 8/1982 | ............ B23C/3/16 |
| JP | 8-309851 | 11/1996 | ........... B29C/59/04 |
| WO | WO 95/11464 | 4/1995 | ........... G02B/5/124 |
| WO | WO 95/11469 | 4/1995 | ........... G02B/5/124 |
| WO | WO 95/11471 | 4/1995 | ........... G02B/5/124 |
| WO | WO 96/33839 | 10/1996 | ........... B23K/26/06 |
| WO | WO 97/04939 | 2/1997 | ........... B29C/33/38 |
| WO | WO 98/19842 | 5/1998 | ........... B29C/33/38 |
| WO | WO 98/56966 | 12/1998 | ........... C30B/29/66 |
| WO | WO 99/01273 | 1/1999 | ........... B29D/11/00 |
| WO | WO 00/60385 | 10/2000 | ........... G02B/5/122 |

OTHER PUBLICATIONS

Madou; Fundamentals of Microfabrication; 1997; Chapter 6, pp. 275–323 Sheet entitled "Techmetal 123 Amorphous Nickel Alloy Coating" from Techmetals, Inc.; 07/94; 1 pg.

*Primary Examiner*—Audrey Chang
*Assistant Examiner*—Craig Curtis
(74) *Attorney, Agent, or Firm*—James V. Lilly

(57) ABSTRACT

A process for making molds for retroreflective sheeting and like articles includes making a substrate having a structured surface of geometric structures such as cube corner elements. The structured surface is in one embodiment partially replicated from a previous generation structured surface, and partially machined in the substrate. At least one of the faces of the structured surface is a compound face that has one machined portion and one non-machined portion, such as a replicated portion. The process can be used to manufacture substrates with desirable geometry cube corner elements, such as cube corner elements having a hexagonal outline in plan view, without requiring the use of pin bundling techniques or laminae. The process can also be used to manufacture articles having cube corner elements in which at least one face of the cube corner element has two constituent faces disposed on opposed sides of a transition line that is nonparallel to a nondihedral edge of such cube corner element.

36 Claims, 21 Drawing Sheets

U.S. PATENT DOCUMENTS

| | | | |
|---|---|---|---|
| 4,895,428 A | 1/1990 | Nelson et al. | 350/103 |
| 5,156,863 A | 10/1992 | Pricone et al. | 425/363 |
| 5,429,857 A | 7/1995 | Amemiya et al. | 428/156 |
| 5,450,235 A | 9/1995 | Smith et al. | 359/529 |
| 5,565,151 A | 10/1996 | Nilsen | 264/1.1 |
| 5,600,484 A | 2/1997 | Benson et al. | 359/529 |
| 5,614,286 A | 3/1997 | Bacon, Jr. et al. | 428/161 |
| 5,657,162 A | 8/1997 | Nilsen et al. | 359/530 |
| 5,696,627 A * | 12/1997 | Benson et al. | 359/529 |
| 5,706,132 A | 1/1998 | Nestegard et al. | 359/529 |
| 5,734,501 A | 3/1998 | Smith | 359/530 |
| 5,759,468 A | 6/1998 | Smith et al. | 264/227 |
| 5,812,315 A | 9/1998 | Smith et al. | 359/529 |
| 5,822,121 A | 10/1998 | Smith et al. | 359/520 |
| 5,837,082 A | 11/1998 | Grafe | 156/154 |
| 5,866,233 A | 2/1999 | Oshima et al. | 428/172 |
| 6,010,609 A | 1/2000 | Mimura et al. | 205/70 |

* cited by examiner

*Fig. 15a*  *Fig. 15b*
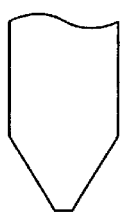
*Fig. 15c*  *Fig. 15d*
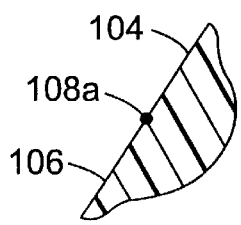
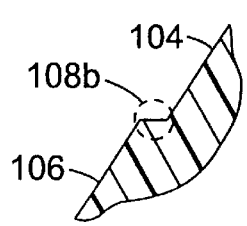
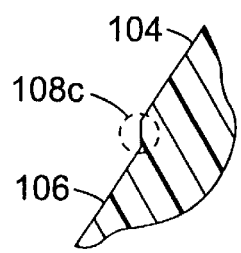
*Fig. 16a*  *Fig. 16b*  *Fig. 16c*
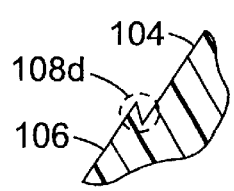
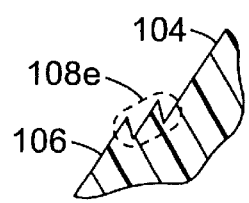
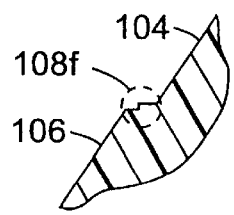
*Fig. 16d*  *Fig. 16e*  *Fig. 16f*

STRUCTURED SURFACE ARTICLES CONTAINING GEOMETRIC STRUCTURES WITH COMPOUND FACES AND METHODS FOR MAKING SAME

CROSS REFERENCE TO RELATED APPLICATION

This application is a continuation-in-part of, and claims priority under 35 U.S.C. §§120, 365(c) to PCT Application No. PCT/US99/07618, filed Apr. 7, 1999.

BACKGROUND

The present invention relates generally to structured surfaces fabricated using microreplication techniques. The invention has particular application to structured surfaces that comprise retroreflective cube corner elements.

The reader is directed to the glossary at the end of the specification for guidance on the meaning of certain terms used herein.

It is known to use microreplicated structured surfaces in a variety of end use applications such as retroreflective sheeting, mechanical fasteners, and abrasive products. Although the description that follows focuses on the field of retroreflection, it will be apparent that the disclosed methods and articles can equally well be applied to other fields that make use of microreplicated structured surfaces.

Cube corner retroreflective sheeting typically comprises a thin transparent layer having a substantially planar front surface and a rear structured surface comprising a plurality of geometric structures, some or all of which include three reflective faces configured as a cube corner element.

Cube corner retroreflective sheeting is commonly produced by first manufacturing a master mold that has a structured surface, such structured surface corresponding either to the desired cube corner element geometry in the finished sheeting or to a negative (inverted) copy thereof, depending upon whether the finished sheeting is to have cube corner pyramids or cube corner cavities (or both). The mold is then replicated using any suitable technique such as conventional nickel electroplating to produce tooling for forming cube corner retroreflective sheeting by processes such as embossing, extruding, or cast-and-curing. U.S. Pat. No. 5,156,863 (Pricone et al.) provides an illustrative overview of a process for forming tooling used in the manufacture of cube corner retroreflective sheeting. Known methods for manufacturing the master mold include pin-bundling techniques, laminate techniques, and direct machining techniques. Each of these techniques has its own benefits and limitations.

In pin bundling techniques, a plurality of pins, each having a geometric shape such as a cube corner element on one end, are assembled together to form a master mold. U.S. Pat. No. 1,591,572 (Stimson) and U.S. Pat. No. 3,926,402 (Heenan) provide illustrative examples. Pin bundling offers the ability to manufacture a wide variety of cube corner geometries in a single mold, because each pin is individually machined. However, such techniques are impractical for making small cube corner elements (e.g. those having a cube height less than about 1 millimeter) because of the large number of pins and the diminishing size thereof required to be precisely machined and then arranged in a bundle to form the mold.

In laminate techniques, a plurality of plate-like structures known as laminae, each lamina having geometric shapes formed on one end, are assembled to form a master mold. Laminate techniques are generally less labor intensive than pin bundling techniques, because the number of parts to be separately machined is considerably smaller, for a given size mold and cube corner element. However, design flexibility suffers relative to that achievable by pin bundling. Illustrative examples of laminate techniques can be found in U.S. Pat. No. 4,095,773 (Lindner); International Publication No. WO 97/04939 (Mimura et al.); and U.S. application Ser. No. 08/886,074, "Cube Corner Sheeting Mold and Method of Making the Same", filed Jul. 2, 1997.

In direct machining techniques, series of groove side surfaces are formed in the plane of a planar substrate to form a master mold. In one well known embodiment, three sets of parallel grooves intersect each other at 60 degree included angles to form an array of cube corner elements, each having an equilateral base triangle (see U.S. Pat. No. 3,712,706 (Stamm)). In another embodiment, two sets of grooves intersect each other at an angle greater than 60 degrees and a third set of grooves intersects each of the other two sets at an angle less than 60 degrees to form an array of canted cube corner element matched pairs (see U.S. Pat. No. 4,588,258 (Hoopman)). Direct machining techniques offer the ability to accurately machine very small cube corner elements in a manner more difficult to achieve using pin bundling or laminate techniques because of the latter techniques' reliance on constituent parts that can move or shift relative to each other, and that may separate from each other, whether during construction of the mold or at other times. Further, direct machining techniques produce large area structured surfaces that generally have higher uniformity and fidelity than those made by pin bundling or laminate techniques, since, in direct machining, a large number of individual faces are typically formed in a continuous motion of the cutting tool, and such individual faces maintain their alignment throughout the mold fabrication procedure.

However, a significant drawback to direct machining techniques has been reduced design flexibility in the types of cube corner geometries that can be produced. By way of example, the maximum theoretical total light return of the cube corner elements depicted in the Stamm patent referenced above is approximately 67%. Since the issuance of that patent, structures and techniques have been disclosed which greatly expand the variety of cube corner designs available to the designer using direct machining. See, for example, U.S. Pat. No. 4,775,219 (Appledorn et al.); U.S. Pat. No. 4,895,428 (Nelson et al.); U.S. Pat. No. 5,600,484 (Benson et al.); U.S. Pat. No. 5,696,627 (Benson et al.); and U.S. Pat. No. 5,734,501 (Smith). Some of the cube corner designs disclosed in these later references can exhibit effective aperture values well above 67% at certain observation and entrance geometries.

Nevertheless, an entire class of cube corner elements, referred to herein as "preferred geometry" or "PG" cube corner elements, have up until now remained out of reach of known direct machining techniques. A substrate incorporating one type of PG cube corner element is shown in the top plan view of FIG. 1. The cube corner elements shown there each have three square faces, and a hexagonal outline in plan view. One of the PG cube corner elements is highlighted in bold outline for ease of identification. The highlighted cube corner element can be seen to be a PG cube corner element because it has a non-dihedral edge (any one of the six edges that have been highlighted in bold) that is inclined relative to the plane of the structured surface, and such edge is parallel to adjacent nondihedral edges of neighboring cube corner elements (each such edge highlighted in bold is not only parallel to but is contiguous with nondihedral edges of its six neighboring cube corner elements). Disclosed herein are methods for making geometric structures, such as PG cube corner elements, that make use of direct machining techniques. Also disclosed are articles manufactured according to such methods, such articles characterized by having at least one specially configured compound face.

BRIEF SUMMARY

Structured surface articles such as molds or sheetings are disclosed in which a geometric structure has a plurality of faces. At least one of the faces is a compound face comprising a machined portion and a non-machined portion. The non-machined portion can be formed by, for example, replication from another substrate or embossing with a suitable tool. A transition line may separate the machined portion from the non-machined portion. The geometric structure can of course comprise faces arranged to form a cube corner element.

Cube corner elements, and structured surfaces incorporating an array of such elements, are disclosed wherein at least one face of the cube corner element terminates at a nondihedral edge of such element, the face comprising two constituent faces disposed on opposed sides of a transition line that is nonparallel to the nondihedral edge. The cube corner element can comprise a PG cube corner element, and exactly one, exactly two, or all three faces of such element can comprise two constituent faces disposed on opposed sides of a transition line that is nonparallel to the respective nondihedral edge. In an array of neighboring cube corner elements, each cube corner element in the array can have at least one face configured as described above. Further, the cube corner elements can be made very small (well under 1 mm cube height) due to the direct machining techniques employed.

Molds are disclosed in which the structured surface comprises pyramids disposed proximate to at least one cavity, the cavity being formed by non-machined faces and the pyramids being formed at least in part by machined faces.

Methods are disclosed for making a structured surface article comprising at least one geometric structure. The method includes providing a prepared substrate having a non-machined face, and removing material from the prepared substrate to form a machined face such that the machined face and the non-machined face together form one of the faces of the geometric structure.

Methods are also disclosed for forming in a substrate a structured surface that extends along a reference plane and contains PG cube corner elements. The method includes providing a prepared substrate, and forming groove side surfaces in the prepared substrate that extend along axes that are substantially parallel to the reference plane. Faces formed by the groove side surfaces together with other faces incorporated in the prepared substrate combine to form the PG cube corner elements.

Various methods are disclosed for providing the prepared substrate. One such method begins by forming an array of non-machinable protrusions (or cavities) in a first initial substrate, whether by mechanical, chemical, electromagnetic, or other suitable means. A negative copy of the first initial substrate is made in a second initial substrate composed of a material suitable for machining. Upper portions of the protrusions in the second initial substrate are machined to form pyramids. A negative copy of the second initial substrate is then made to form the prepared substrate. The prepared substrate includes cavities corresponding to the pyramids formed in the second initial substrate, and also includes protrusions between the cavities. In some embodiments, the pyramids are cube corner pyramids and the cavities are thus cube corner cavities.

With such a prepared substrate, groove side surfaces are then formed by selectively machining the protrusions in such a way that the machined faces formed in the protrusions are in substantial alignment with faces ("non-machined faces") of neighboring cube corner cavities, which faces had been replicated from the second initial substrate. At least one face of the PG cube corner elements is a compound face that includes both one of the machined faces and one of the non-machined faces. The compound face may include a transition line that separates the replicated face from the machined face. Retroreflective sheeting or other cube corner articles can then be replicated from the prepared substrate as modified by the direct machining operations.

Another method for providing the prepared substrate begins with the prepared substrate having a substantially flat working surface. An array of cube corner cavities is then formed deep in the working surface by embossing with a hardened tool. Intermediate portions of the working surface forming protrusions between the cube corner cavities are left unfinished. Groove side surfaces are then formed selectively in the protrusions to form machined faces, the machined faces and the embossed faces of the cube corner cavities together forming the array of cube corner elements.

BRIEF DESCRIPTION OF THE DRAWINGS

FIGS. 15a–d depict the tips of different cutting tools that can be employed in forming groove side surfaces;

FIGS. 16a–f are schematic sectional views that show in magnified fashion the region where two constituent faces of a compound face come together, demonstrating different types of possible transition lines;

FIG. 20b is a sectional view as indicated in FIG. 20a;

Figure 1:
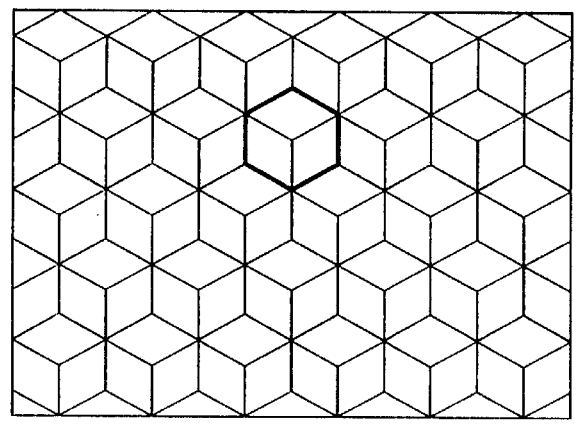
FIG. 1 is a plan view of a structured surface comprising one type of PG cube corner element array, known from the PRIOR ART.

In the drawings, the same reference symbol is used for convenience to indicate elements that are the same or that perform the same or a similar function.

DETAILED DESCRIPTION OF THE ILLUSTRATIVE EMBODIMENTS

Figure 2:
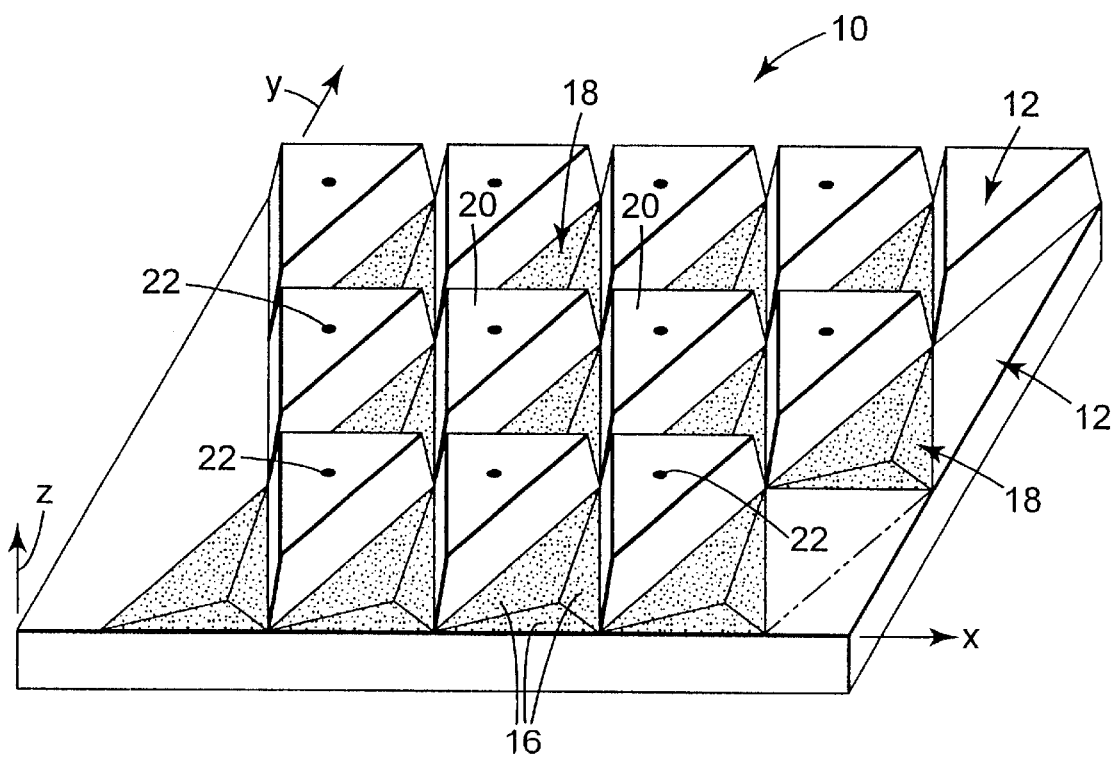
FIG. 2 is a perspective view of a prepared substrate.

In FIG. 2, a prepared substrate 10 is shown enlarged in perspective view. A description of how prepared substrate 10 can be fabricated is deferred for later discussion below. Substrate 10 has a structured surface 12 that generally defines a reference plane x-y. Structured surface 12 includes faces 16 arranged in groups of three that form cube corner cavities 18. Interspersed between cube corner cavities 18 on structured surface 12 are protrusions 20. The protrusions as shown each have three side surfaces and a top surface, and are of triangular cross section. Depending on the procedure used to make the prepared substrate, the side surfaces of the protrusions 20 can be inclined to a greater or lesser extent away from the vertical. In the figure, reference points 22 located on the top surfaces of protrusions 20 are shown for ease of description. It is not critical that the tops of protrusions 20 pass through the locations marked by reference points 22, nor is it critical that the side surfaces or top surface have a well defined shape, orientation, or surface finish. This is because outer portions of protrusions 20 are removed in subsequent direct machining operations.

Figure 3:
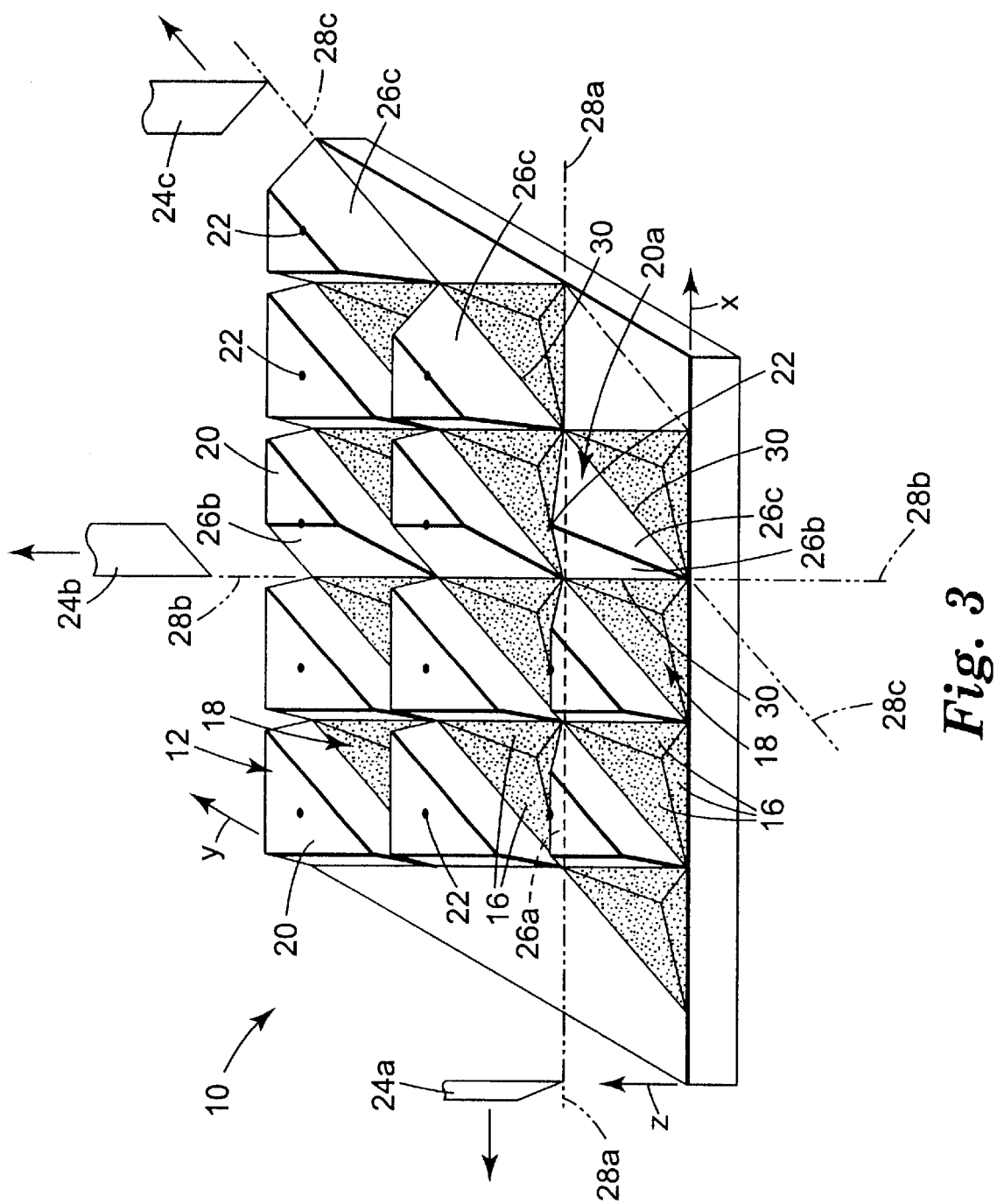
FIG. 3 is a perspective view of the substrate of FIG. 2 after machining some groove side surfaces.

FIG. 3 depicts the prepared substrate 10 at an intermediate stage during such a direct machining operation. Cutting tools 24a,24b,24c (collectively referred to as 24) move along structured surface 12, whether by motion of the cutting tools or the substrate or both, to form groove side surfaces 26a (hidden from view from the perspective of FIG. 3), 26b,26c respectively. Each tool 24 is depicted as a so-called "half-angle" tool, which produces only one groove side surface as it progresses through the material rather than a pair of opposed groove side surfaces, although this is not necessary. Consistent with direct machining procedures, cutting tools 24 move along axes 28a,28b,28c that are substantially parallel to the x-y reference plane, thus ensuring that the respective groove side surfaces also extend along axes that are substantially parallel to the reference plane. Preferably, the axes 28a,28b,28c are carefully positioned and the tool orientation carefully selected so that the groove side surfaces are substantially aligned (translationally and rotationally) with adjacent faces 16 of the cube corner cavities 18. Relatively small misalignments, discussed infra, may however be tolerated or may even be desirable as a function of the desired optical characteristics of the cube corner article and the precision of available cutting machinery. Regardless of the degree of alignment, transition lines 30 separate groove side surfaces from faces 16 of cavities 18. As seen in FIG. 3, a protrusion 20 that has been machined by all of the cutting tools forms a protrusion referred to as a geometric structure 20a, which structure includes one face from each groove side surface 26a,26b, 26c. In the case where the three faces of structure 20a are substantially aligned with adjacent faces 16 of cavities 18, and where such cavities 18 have a common orientation, the three faces of structure 20a (when considered separately) form a "truncated" cube corner pyramid. Such a pyramid is characterized by having exactly three nondihedral edges 300 that form a "base triangle" in the plane of the structured surface.

Substrate 10 is composed of a material that can be scribed, cut, or otherwise machined without significant post-machining deformation and without substantial burring. This is to ensure that the machined faces, or replications thereof in other substrates, can function as effective optical reflectors. Further discussion on suitable substrate materials is given below.

It should be noted that although three cutting tools are shown in FIG. 3, a single cutting tool can be used. The cutting tool can be made of diamond or other suitably hard material. The machined faces can be formed by any one of a number of known material removal techniques, for example: milling, where a rotating cutter, spinning about its own axis, is tilted and drawn along the surface of the substrate; fly-cutting, where a cutter such as a diamond is mounted on the periphery of a rapidly rotating wheel or similar structure which is then drawn along the surface of the substrate; ruling, where a nonrotating cutter such as a diamond is drawn along the surface of the substrate; and grinding, where a rotating wheel with a cutting tip or edge is drawn along the surface of the substrate. Of these, preferred methods are those of fly-cutting and ruling. It is not critical during the machining operation whether the cutting tool, the substrate, or both are translated relative to the surroundings. Full-angle cutting tools are preferred when possible over half-angle tools because the former are less prone to breakage and allow higher machining rates. Finally, cutting tools having a curved portion or portions can be used in the disclosed embodiments to provide non-flat (curved) surfaces or faces in order to achieve desired optical or mechanical effects.

Figure 4:
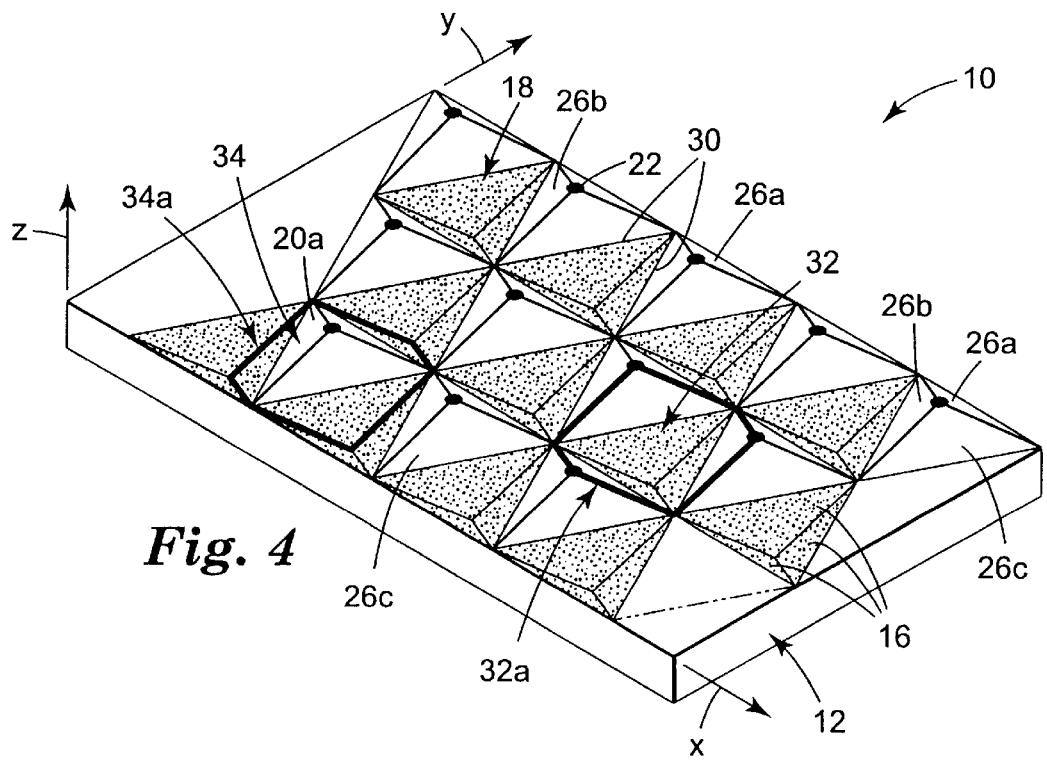
FIG. 4 is a perspective view of the substrate of FIG. 2 after machining all of the groove side surfaces.

FIG. 4 is a view of substrate 10 after all groove side surfaces have been formed by direct machining operations. As shown, all of the protrusions 20 previously seen in FIGS. 2 and 3 have been modified to form geometric structures 20a. Each geometric structure 20a comprises three machined faces, one each from groove side surfaces 26a, 26b, and 26c, configured approximately mutually perpendicular to each other to form a truncated cube corner pyramid. Each of these three faces is machined to be subtantially aligned with the nearest face of an adjacent cube corner cavity 18. Because of this, new cube corner cavities 32 are formed, each new cube corner cavity 32 comprising one cube corner cavity 18 and one face each of its neighboring geometric structures 20a. Reference numeral 32a shows in bold outline one such cube corner cavity 32. A given face of one of the cube corner cavities 32 comprises one face of a cube corner cavity 18 and one of the machined faces 26a, 26b, or 26c. As will be discussed infra, faces 16 of the cube corner cavity 18 are non-machined faces. Therefore, each cube corner cavity 32 comprises a compound face made up of a non-machined portion and a machined portion. The transition lines 30 separate the machined from the non-machined portions.

One can also identify new cube corner pyramids 34 formed on the structured surface shown in FIG. 4. Each cube corner pyramid 34 comprises one geometric structure 20a, which is a cube corner pyramid, and one face each of its neighboring cube corner cavities 18. Each face of one of the pyramids 34 is a compound face comprising a non-machined face 16 from one of the cavities 18 and a machined face from structure 20a. Reference numeral 34a shows in bold outline one such cube corner pyramid 34. Note that the reference points 22 locate the uppermost extremities or peaks of the pyramids 34. Both cube corner pyramids 34 and cube corner cavities 32 are PG cube corner elements, since both have a face terminating at a nondihedral edge 300 of the cube corner element, such nondihedral edge 300 being nonparallel to reference plane x-y.

Figure 5:
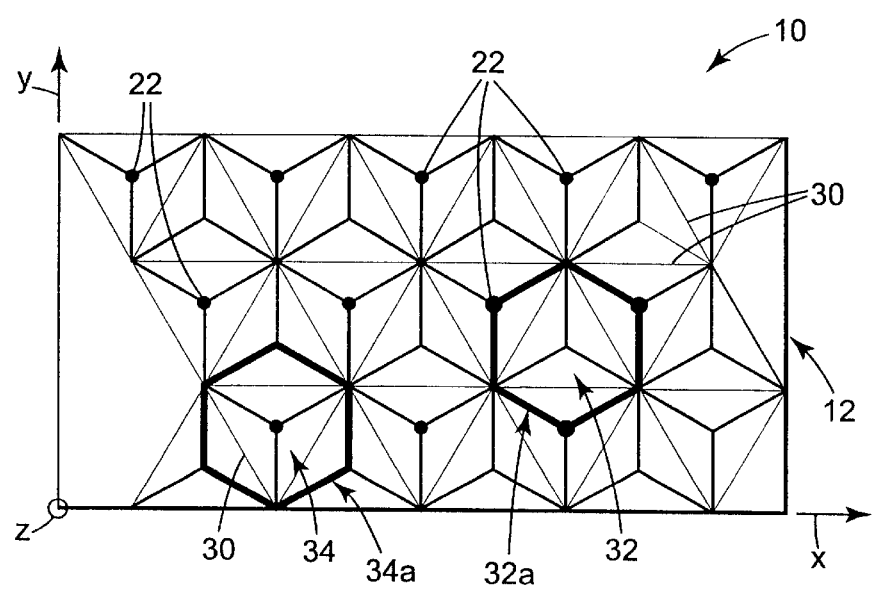
FIG. 5 is a top plan view of FIG. 4.

FIG. 5 shows a top view of the structured surface of FIG. 4. Transition lines 30 are drawn narrower than other lines to aid in identifying the PG cube corner elements, i.e. cube corner cavities 32 and cube corner pyramids 34. The compound faces of such PG cube corner elements have a machined and non-machined portion disposed on opposed sides of transition lines 30. In the embodiment of FIGS. 2–5, all transition lines 30 lie in a common plane referred to as a transition plane, which in the case of this embodiment is coplanar with the x-y plane. The non-machined faces of the structured surface are disposed on one side of the transition plane and the machined faces are disposed on the other side.

Although structural differences between machined and non-machined surfaces are subtle, such differences can generally be detected by inspection of the underlying material. Some suitable inspection techniques include examination of the grain or crystalline structure, molecular orientation, or variations in the amount of trace elements such as chromates or lubricants.

The directly machined cube corner article of FIGS. 2–5 can itself function as a retroreflective article, both with respect to light incident from above (by virtue of cube corner cavities 32) and, where the substrate is at least partially transparent, with respect to light incident from below (by virtue of cube corner pyramids 34). In either case, depending upon the composition of the substrate, a specularly reflective thin coating such as aluminum, silver, or gold can be applied to the structured surface to enhance the reflectivity of the compound faces. In the case where light is incident from below, reflective coatings can be avoided in favor of an air interface that provides total internal reflection.

More commonly, however, the directly machined prepared substrate of FIGS. 2–5 is used as a mold from which end-use retroreflective articles are made, whether directly or through multiple generations of molds, using conventional replication techniques. Each mold or other article made from the directly machined prepared substrate will nevertheless contain cube corner elements having at least one face terminating at a nondihedral edge 300 of the cube corner element, the at least one face comprising two constituent faces disposed on opposed sides of a transition line, the transition line being nonparallel to such nondihedral edge. As seen from FIGS. 4 and 5, transition lines 30 lie in the transition plane coincident with the x-y plane, whereas nondihedral edges 300 shown in bold for both PG cube corner cavity 32 and PG cube corner pyramid 34 are inclined relative to the x-y plane. It is also possible to fabricate surfaces where the transition lines do not all lie in the same plane, by forming groove side surfaces at different depths in the substrate.

Figure 6:
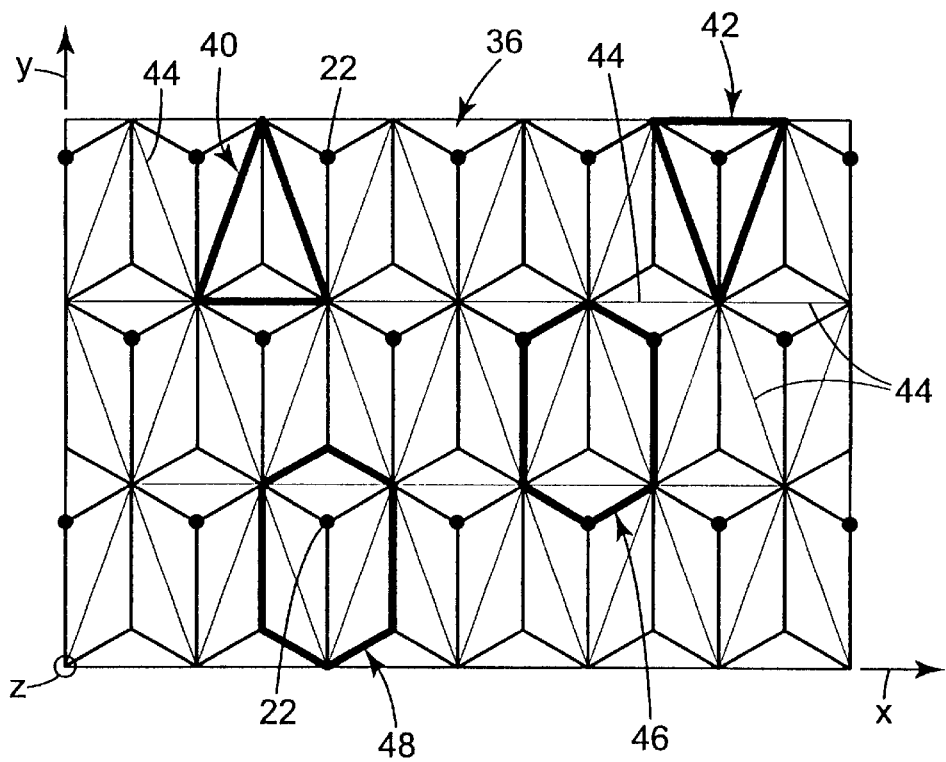
FIGS. 6–8 are top plan views of structured surfaces having canted PG cube corner elements, such surfaces being capable of fabrication using the methods discussed in connection with FIGS. 2–5.

A wide variety of structured surfaces can be fabricated using the direct machining technique described above. The PG cube corner elements of FIG. 5 each have a symmetry axis that is perpendicular to the x-y reference plane of the structured surface. Cube corner elements typically exhibit the highest optical efficiency in response to light incident on the element roughly along the symmetry axis. The amount of light retroreflected by a cube corner element generally drops as the incidence angle deviates from the symmetry axis. FIG. 6 shows a top plan view of a structured surface 36 similar to that of FIG. 5, extending along the x-y plane, except that the PG cube corner elements of FIG. 6 are all canted such that their symmetry axes are tilted with respect to the normal of the structured surface. The symmetry axis for each PG cube corner cavity 46 in FIG. 6 lies in a plane parallel to the y-z plane, having a vertical component in the +z direction (out of the page) and a transverse component in the +y direction. Symmetry axes for the PG cube corner pyramids 48 of FIG. 6 point in the opposite direction, with components in the −z and −y directions. In fabricating surface 36, a prepared substrate (see FIG. 13, infra) is used wherein the protrusions of generally triangular cross-section are isosceles in shape, rather than equilateral as in FIG. 2. Further, the non-machined cube corner cavity faces are arranged to have a similarly shaped isosceles triangle outline.

Four distinct types of cube corner elements are present on the structured surface 36: truncated cube corner cavities having non-machined faces and a triangular outline in plan view; truncated cube corner pyramide having machined faces and trianglar outline; PG cube corner cavities having compound faces and a hexagonal outline; and PG cube corner pyramids, also having compound faces and a hexagonal outline. A representative non-machined cube corner cavity is identified in FIG. 6 by bold outline 40, and a representative machined cube corner pyramid is identified by bold outline 42. Transition lines 44 separate machined from non-machined faces, and all such lines 44 lie in a transition plane parallel to the x-y plane. In other embodiments, the transition lines may lie parallel to a transition plane but not be coplanar. Selected faces of cavities 40 and pyramids 42 form canted PG cube corner elements, in particular canted PG cube corner cavities 46 and canted PG cube corner pyramids 48. Reference points 22, as before, identify localized tips or peaks disposed above the x-y plane.

Figure 7:
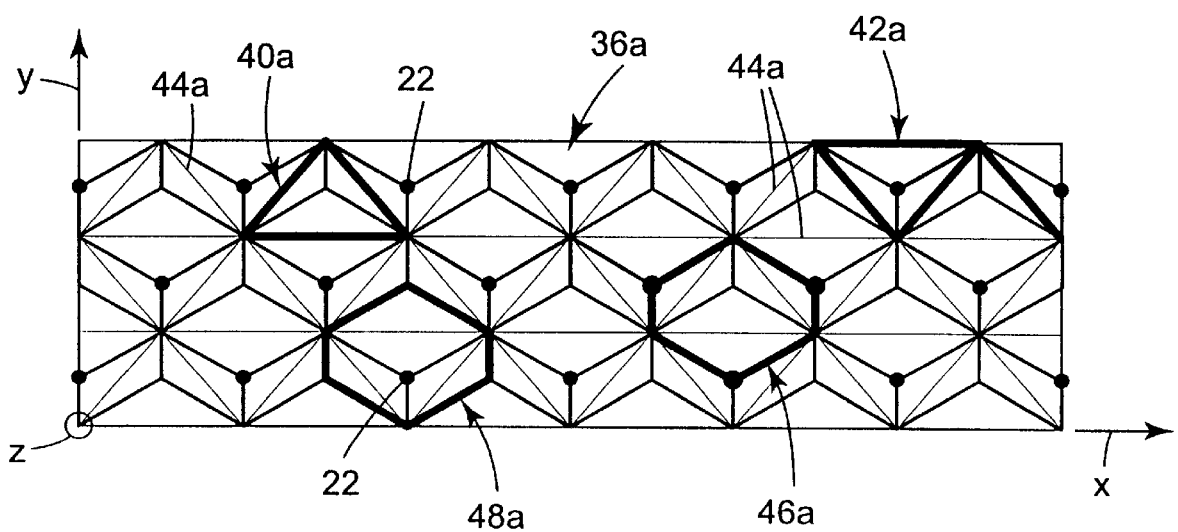

FIG. 7 shows a structured surface 36a similar to that of FIG. 6, and like features bear the same reference numeral as in FIG. 6 with the added suffix "a". PG cube corner elements of FIG. 7 are canted with respect to the normal of structured surface 36a, but in a different direction compared to that of the PG cube corner elements of FIG. 6. The symmetry axis for each PG cube corner cavity 46a is disposed in a plane parallel to the y-z plane, and has a vertical component in the +z direction and a transverse component in the −y direction.

Figure 8:
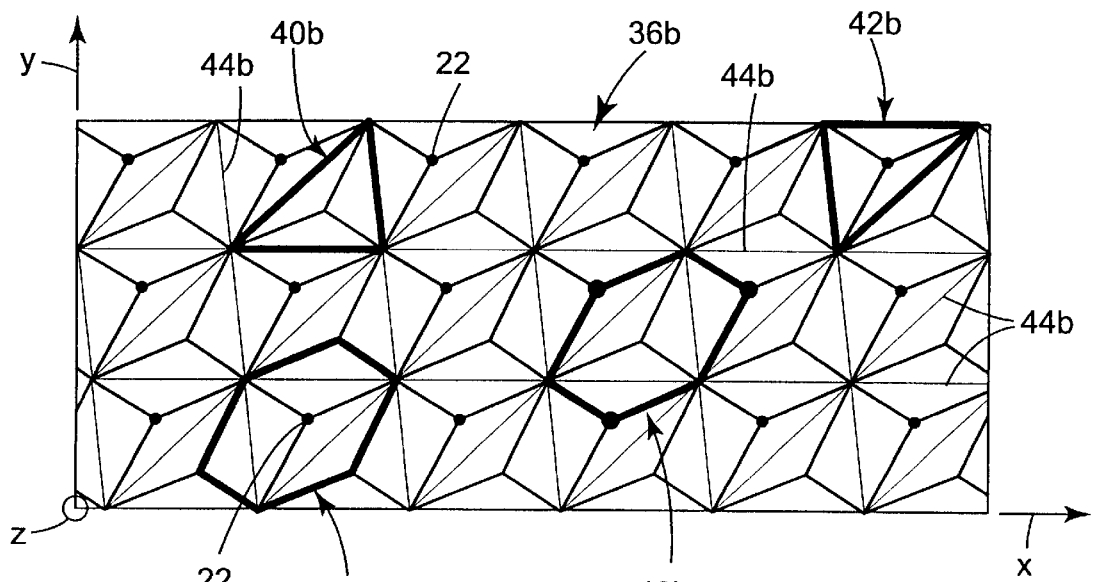

FIG. 8 shows a structured surface similar to that of FIGS. 6 and 7, and like features bear the same reference numeral as in FIG. 6 with the added suffix "b". PG cube corner elements in FIG. 8 are also canted, but, unlike the PG cube corner elements of FIGS. 6 and 7, the degree of cant is such that the octagonal outline in plan view of each PG cube corner element has no mirror-image plane of symmetry. The cube corner cavities of FIG. 8 each have a symmetry axis that has components in the +z, +y, and −x direction. It will be noted that the triangles formed by transition lines 44 (FIG. 6) are isosceles triangles each having only one included angle less than 60 degrees; triangles formed by lines 44a (FIG. 7) are isosceles triangles each having only one included angle greater than 60 degrees; and triangles formed by lines 44b (FIG. 8) are scalene triangles. Representative values in degrees for the included angles of such triangles are, respectively: (70, 70, 40); (80, 50, 50); and (70, 60, 50).

Figure 12:
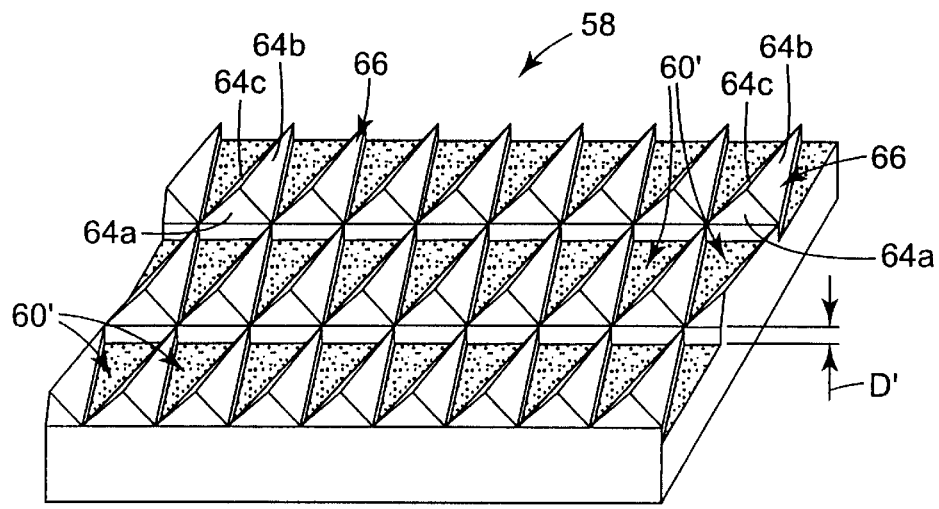
FIG. 12 is a perspective view of the substrate of FIG. 11 after directly machining groove side surfaces in the protrusions thereof to form cube corner pyramids therein.

With the aid of FIGS. 9–13, methods for fabricating a prepared substrate suitable for use in the invention will now be described. For illustrative purposes a structured surface useful for producing the structured surface of FIG. 6 is described. The same principles can however be straightforwardly applied to other embodiments. In brief, a structured surface comprising an array of protrusions is formed in a first substrate (FIGS. 9–10), by a process other than direct machining. A negative copy of the structured surface is then made in a second substrate (FIG. 11) composed of a substance capable of being machined. Upper portions of protrusions in the structured surface of the second substrate are then directly machined to form cube corner pyramids (FIG. 12). Finally, a negative copy of the structured surface of the machined second substrate is made in a third substrate (FIG. 13) to form the prepared substrate, in which an array of cube corner cavities (having replicated faces) is intermeshed with an array of protrusions. The machined second substrate can if desired be used thereafter as a master from which a large number of identical prepared substrates can be electroformed or otherwise replicated.

Many variations of the procedure are possible. In one, the first and second substrates are bypassed, and the desired structured surface is imparted directly into the prepared substrate using an embossing tool. In another, the first substrate is composed of a machinable material so that cube corner pyramids are formed in the first substrate and the third substrate is replicated directly from the first substrate rather than from an intermediate second substrate. As discussed below, machinable laminae can also be used in manufacturing the prepared substrate.

Figure 9:
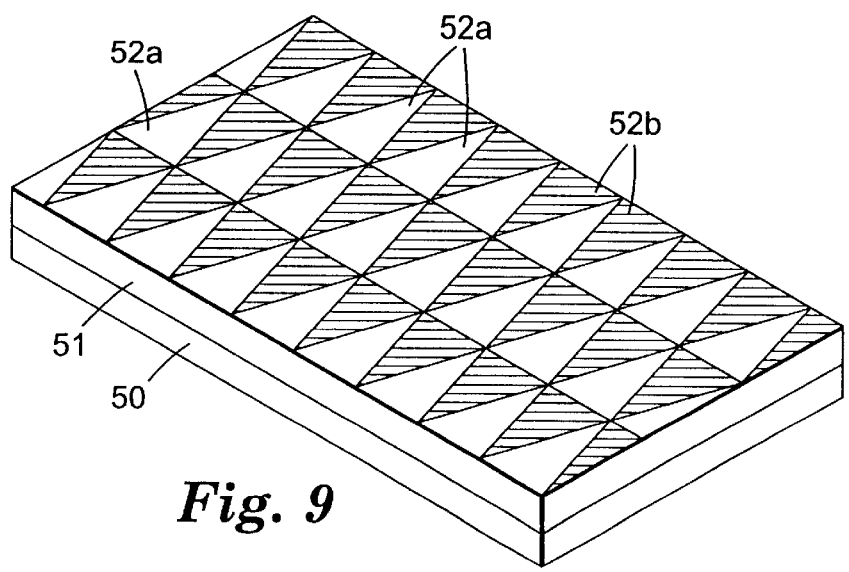
FIG. 9 is a perspective view of a masked substrate.

Turning to FIG. 9, a substrate comprising flat lower and upper layers 50, 51 is shown carrying a patterned masking layer 52. Masking layer 52 is patterned in the form of intermeshing arrays of triangles, the size and shape of which are selected to closely approximate the network of transition lines appearing in the finished mold (see FIG. 6). Triangular windows 52a have been formed so that layer 52 comprises an array of triangular-shaped islands 52b. One way of forming such a patterned masking layer 52 is with conventional photoresist and well known photolithographic techniques. For example, layer 52 can initially be applied to the substrate as a uniform layer of metal. Then, a layer of positive or negative photoresist is applied on top of layer 52. Portions of the photoresist are selectively exposed to light using a mask that bears the triangular array pattern, or its inverse, and subsequently exposed or unexposed portions of the photoresist are chemically removed. This opens triangular-shaped windows in the photoresist, so that a second chemical applied to the surface can selectively attack exposed portions of layer 52. After removing the remaining photoresist, only triangular islands of layer 52 remain on the substrate surface.

Figure 10:
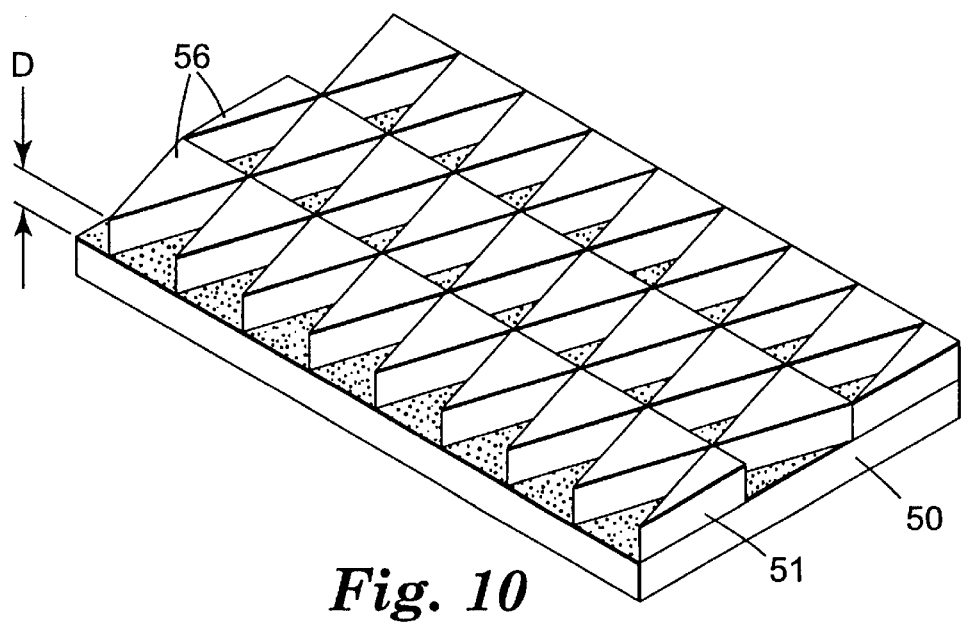
FIG. 10 is a perspective view of the substrate of FIG. 9 after forming protrusions therein with the aid of the mask.
Figure 11:
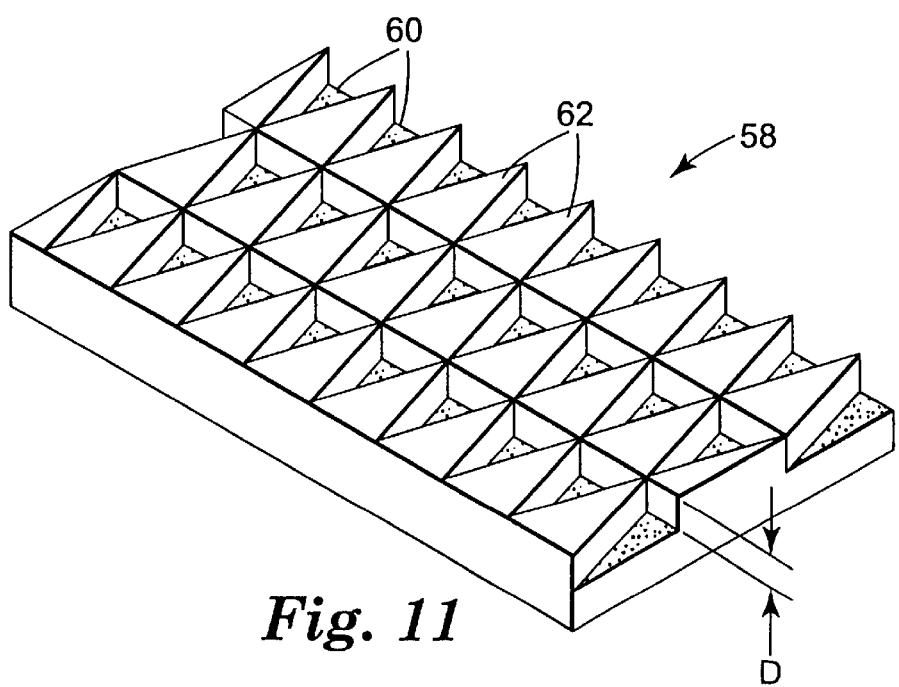
FIG. 11 is a perspective view of a substrate having a non-machinable structured surface replicated from the substrate of FIG. 10.

In FIG. 10, protrusions 56 having the desired cross-sectional shape have been formed in the substrate by exposing the masked surface to an anisotropic etching agent and etching completely through upper layer 51. Lower surfaces are shown shaded in FIG. 10 and in subsequent FIGS. 11–13. Although it is possible for layers 50 and 51 to be composed of the same material, in a more preferred approach upper layer 51 is composed of a polymeric material, layers 50 and 52 comprise a metal such as copper that functions as an etch stop, and the etching agent is an intense electromagnetic beam illuminating the entire upper surface. Exposed regions of layer 51 are ablated by the electromagnetic beam, and regions protected by islands 52b are left intact. The electromagnetic etching agent proceeds through the material substantially only along an axis approximately normal to the surface, rather than isotropically. This behavior avoids undercutting substrate material beneath masking layer islands 52b, yielding reasonably well-formed cavities with highly sloped walls and substantially flat bottoms, the cavities defining an array of complementary protrusions 56. After etching completely through layer 51 a depth D into the substrate, the anisotropic etching agent is removed and the remaining masking layer is subsequently eliminated. Depth D is preferably selected to be equal to or greater than the cube height of the PG cube corner elements in the finished mold.

In another approach, a substrate similar to that of FIG. 9 is used except that it includes no patterned masking layer 52. Triangular cavities are instead formed by exposing the upper layer 51 to an electromagnetic beam that is itself patterned by a conventional mask and optical system such that areas corresponding to 52a are illuminated and areas corresponding to 52b are not. An example of this approach was demonstrated on a substrate in which lower layer 50 was copper and upper layer 51 was a 0.125 mm thick piece of Kapton H film sold by E. I. Du Pont de Nemours and Company, although Kapton V film and other polyimides are also useable. The electromagnetic etching agent was a pulsed krypton-fluoride laser having a wavelength of 248 nm and an energy density between about 0.5 and 1.2 Joules/cm$^2$. Following the ablation procedure, side walls of the protrusions were found to be sloped at about a 5 degree angle measured from the normal, inclined in such a way that the bases of the protrusions were slightly larger than the tops.

Alternative techniques for producing the surface shown in FIG. 10 will be readily apparent to those skilled in the microfabrication arts, techniques such as ion milling, knurling, chemical etching, and even hot melting where the substrate is composed of soft, low melting point material such as wax. The technique known as LIGA, described for instance in Chapter 6 of *Fundamentals of Microfabrication* by Marc Madou, (CRC Press 1997), is another available technique.

In general, the substrate of FIG. 10 might not be composed of a material suitable for directly machining smooth, accurate surfaces therein. Therefore, the surface features of FIG. 10 may need to be replicated or otherwise copied in another substrate, shown in FIG. 11 with reference numeral 58, such substrate 58 composed of a material suitable for direct machining. Substrate 58 is shown to have a structured surface that is a negative copy of the structured surface of substrate 50. Thus, cavities 60 correspond substantially to protrusions 56, and protrusions 62 correspond substantially to cavities in substrate 50 that are bounded by protrusions 56. A substrate having a positive copy of the structured surface of substrate 50 could equally well be used in place of substrate 58.

The upper portions of protrusions 62 are then directly machined with a suitable cutting tool such as a full- or half-angle tool. The tools are guided along axes that are parallel to the substrate and precisely aligned with borders of the triangular protrusions in order to form groove side surfaces 64a,64b,64c as shown in FIG. 12. The depth of the cutting tool is limited to some fraction, preferably about one-half, of the dimension D. The groove side surfaces are cut at angles such that truncated cube corner pyramids 66 are formed on the upper halves of protrusions 62. As a consequence of machining only the upper portions of protrusions 62, the lower portions of cavities 60 remain intact, such lower portions referred to as reduced cavities 60'. The reduced cavities have a depth D', which preferably satisfies the following relationship:

$$D' \geq \text{(desired } PG \text{ cube height)} - \text{(cube corner pyramid 66 cube height)}$$

Finally, to obtain the prepared substrate, a negative copy of the structured surface of substrate 58 is made by a suitable replication technique in a substrate 68, which is the prepared substrate in which the PG cube corner elements shown in FIG. 6 are later formed. Substrate 68 has a structured surface 70 comprising cube corner cavities 72 corresponding to cube corner pyramids 66. Significantly, the faces of each cube corner cavity 72 have been formed not by machining surface 70 but instead by replicating surface 70 from another structured surface. Therefore, the faces of cube corner cavities 72 are referred to as non-machined faces. Protrusions 74 are also included on structured surface 70, the protrusions corresponding to reduced cavities 60' and hence having a height D'. Substrate 68 is composed of a machinable material so that precision groove side surfaces can later be machined in the prepared substrate in registration with the non-machined faces of cavities 72 to yield the desired structured surface geometry.

Regarding canting of cube corner elements, it will be apparent that if canted cube corner elements are desired in the final article for a given optical effect, the cube corner pyramids 66 will be configured to be canted so that the corresponding cube corner cavities 72 as well as the PG cube corner cavities 46 (see FIG. 6) will likewise be canted. Alternatively the cube corner elements need not be canted.

Figure 13:
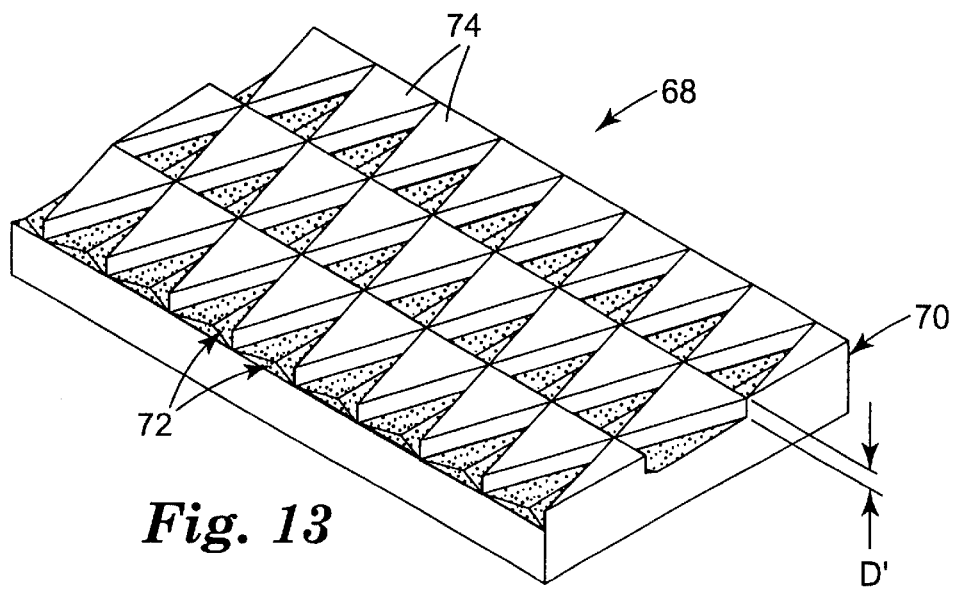
FIG. 13 is a perspective view of a copy of the substrate of FIG. 12, forming a prepared substrate analogous to that of FIG. 2.

As was discussed in connection with FIG. 10, alternative techniques capable of producing a prepared substrate such as shown in FIG. 2 or 13 will be readily apparent to those skilled in the microfabrication arts. In one such alternative technique, a single pin of triangular cross-section and having a cube corner pyramid formed on one end thereof can emboss into a substrate of a suitable plastic material an array of recessed cube corner cavities using a step-and-repeat process. If the plastic material is machinable, it can then function as the prepared substrate, and in a later operation groove side surfaces can be machined into protrusions between the cube corner cavities. In this case the resulting geometric structures will have at least one compound surface having a machined portion and a non-machined portion, the non-machined portion being an embossed face of the cube corner cavity formed by the pin. If the substrate is not machinable, then a prepared substrate can be formed by producing a positive copy of the structured surface in such a machinable material. An even number of conventional replication steps can be used to produce the positive copy.

A variation of the pin embossing technique just described is where a plurality of pins are held together and simultaneously emboss the cube corner cavities to a common depth in an initially flat surface.

Prepared substrates can take on a variety of forms. In each embodiment shown above, the prepared substrate has a structured surface comprising an array of cube corner cavities and protrusions, each protrusion having steeply inclined side walls and a large flattened top surface. When groove side surfaces are later formed in the protrusions, the cutting tool removes a relatively large amount of material because the angle between the steeply inclined side wall and the subsequent machined face is often in excess of 10 degrees, typically ranging from about 10 to about 45 degrees. It may be desirable to provide a modified prepared substrate that has a structured surface more closely resembling the finished mold, for example, a substrate whose individual faces are no more than a few degrees, and preferably in the range of about 2 to about 0.5 degrees, from the desired orientation. Groove side surfaces can then be formed in such a modified prepared substrate by removing much less material from the protrusions during the final groove side surface formation, thereby reducing tool forces which could detrimentally cause distortions. Another benefit is less wear on the cutting tool. A modified prepared substrate can also be used as a master from which a family of differently configured daughter molds can be made.

Figure 14A:
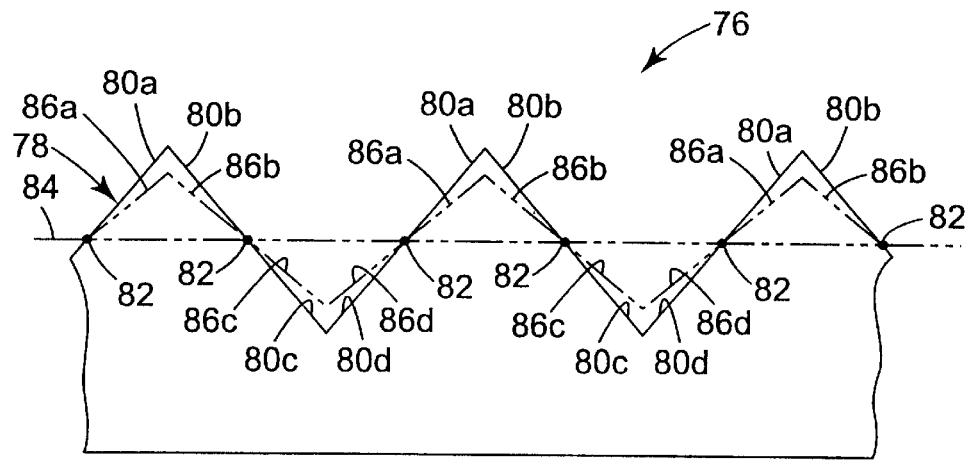
FIGS. 14a–d are schematics showing 2-dimensional representations of the progression from a structured surface article closely approximating a desired geometry to an article or articles that have the desired geometry.

FIGS. 14a–d depict schematically three-dimensional structured surfaces in two dimensions for simplicity. It is to be understood that such structured surfaces would commonly comprise geometric structures comprising at least three-sided pyramids and at least three-sided cavities. In FIG. 14a, a modified prepared substrate 76 is provided with a structured surface 78 comprising actual faces 80a–d as shown. Transition lines 82 (shown as points), lying in a transition plane 84, separate faces 80a,b from faces 80c,d. Reference faces 86a–d are also shown, in broken lines, to represent the desired position of some or all faces in the structured surface of the final mold, which also terminate at transition lines 82. Where the final mold is intended to be retroreflective, reference faces 86a,86d are parallel to each other and perpendicular to faces 86b,86c.

Several features distinguish modified prepared substrate 76 from previously described prepared substrates such as substrate 10 of FIG. 2. First, faces 80c,d are more inclined than faces 86c,d, yielding cavities that are slightly deeper than desired. Such deeper cavities can be formed for example by replicating pyramids that are higher than ordinarily required. Second, protrusions formed by faces 80a,b likewise deviate only slightly from the desired configuration. Faces 80a,b are more inclined than faces 86a,b, yielding protrusions that are slightly higher than desired. Significantly, the actual faces intersect the respective reference faces in transition plane 84, along transition lines 82.

Figure 14B:
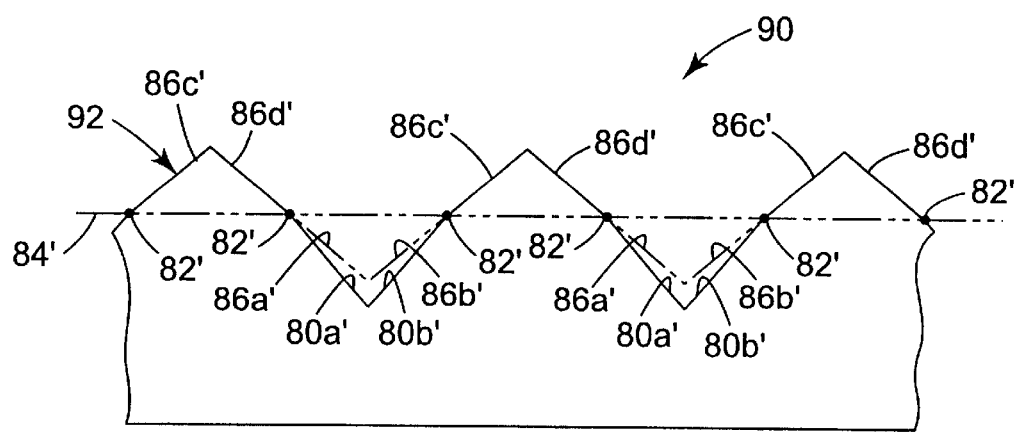

The portions of substrate 76 disposed above plane 84 can then be machined, shaving off the small amount of material necessary to produce protrusions having the desired faces 86a,86b. More preferably, however, substrate 76 is not itself machined but instead is left intact for use in making additional molds. In such case a negative copy of structured surface 78 is first made in another substrate 90 (FIG. 14b). Features of substrate 90 that correspond to features of substrate 76 are given the same reference number, but with the addition of a prime symbol. Faces 80c',80d', formed by replication from faces 80c,80d, are not shown in FIG. 14b because a subsequent direct machining step has formed groove side surfaces in the protrusions so that they terminate at desired faces 86c',86d'. Note that cavities formed by faces 80a',80b' are deeper than desired, because the protrusions from which they were replicated are higher than desired.

Note that the structured surface 92 of substrate 90 contains cavities and pyramids comprising compound faces, one compound face made up of faces 86d' and 80a' and another compound face made up of faces 80b' and 86c'. Constituent faces 86d' and 80a' are only slightly misaligned with each other, as are constituent faces 80b',86c'. Hence, structured surface 90 has the interesting property that it contains cube corner cavities (represented by compound face 86d'–80a' and compound face 80b'–86c') in which the portion of the cavities on one side of plane 84' comprise mutually perpendicular constituent faces and the portion on the other side of plane 84' comprise constituent faces that are not mutually perpendicular, although they are nearly so. The cube corner pyramids formed on structured surface 90 can be characterized in the same way.

Figure 14C:
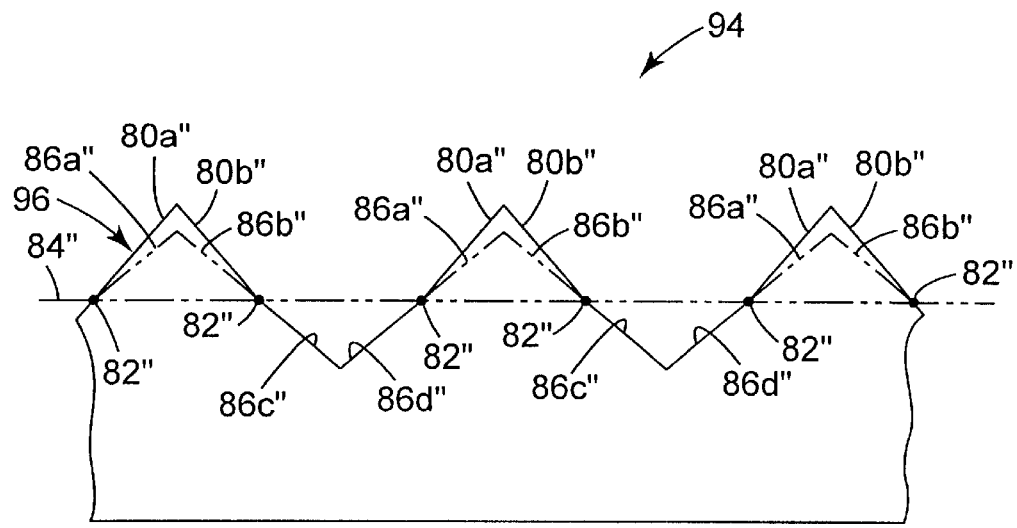
Figure 14D:
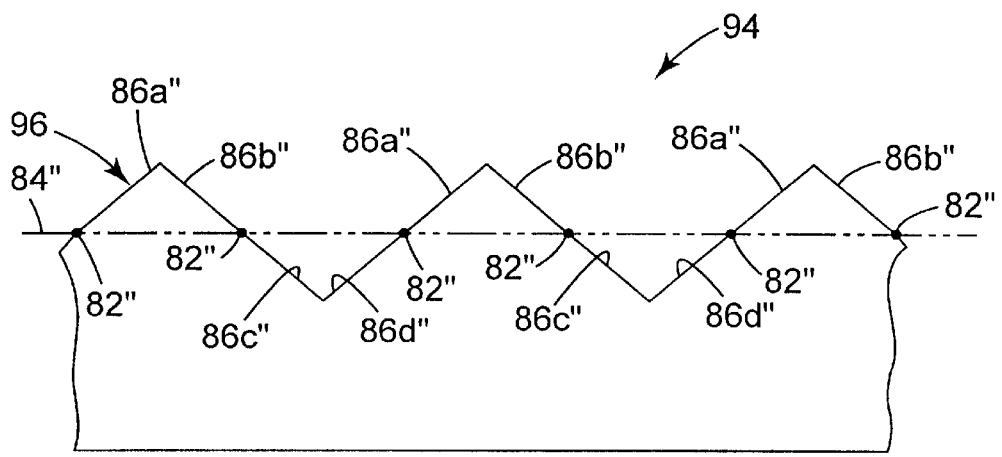

Proceeding to FIG. 14c, a substrate 94 is shown having a structured surface 96 that is replicated from structured surface 92. Double primes have been appended to the reference numerals which otherwise correspond to the designations in FIGS. 14a and 14b. As with structured surface 92, structured surface 96 contains compound face cube corner elements in which the portion of the elements on one side of plane 84" comprise mutually perpendicular constituent faces and the portion on the other side of plane 84" comprise constituent faces that are not mutually perpendicular, although they are nearly so. Substrate 94 shown in FIG. 14c can serve as a prepared substrate for the final mold shown in FIG. 14d. Groove side surfaces are directly machined in the substrate by a cutting tool that stays on the upper side of plane 84" and removes small amounts of material from the protrusions to form machined faces 86a" and 86b", which are in substantial alignment with replicated faces 86d" and 86c" respectively.

The cube corner elements disclosed herein can be individually tailored so as to distribute light retroreflected by the articles into a desired pattern or divergence profile, as taught by U.S. Pat. No. 4,775,219 (Appledorn et al.). For example, compound faces that make up the PG cube corner elements can be arranged in a repeating pattern of orientations that differ by small amounts, such as a few arc-minutes, from the orientation that would produce mutual orthogonality with the other faces of cube corner element. This can be accomplished by machining groove side surfaces (both those that ultimately become the faces in the finished mold below the transition plane as well as those that become faces in the finished mold above the transition plane) at angles that differ from those that would produce mutually orthogonal faces by an amount known as a "groove half-angle error". Typically the groove half-angle error introduced will be less than ±20 arc minutes and often less than ±5 arc minutes. A series of consecutive parallel groove side surfaces can have a repeating pattern of groove half-angle errors such as abbaabba . . . or abcdabcd . . . , where a, b, c, and d are unique positive or negative values. In one embodiment, the pattern of groove half-angle errors used to form faces in the finished mold above the transition plane can be matched up with the groove half-angle errors used to form faces in the finished mold below the transition plane. In this case, the machined and non-machined portions of each compound face will be substantially angularly aligned with each other. In another embodiment, the pattern used to form one set of faces can differ from the pattern used to form the other, as where the faces below the transition plane incorporate a given pattern of nonzero angle errors and faces above the transition plane incorporate substantially no angle errors. In this latter case, the machined and non-machined portions of each compound face will not be precisely angularly aligned with each other.

Advantageously, a substrate such as substrate 76 discussed in connection with FIG. 14a can serve as a master substrate from which a whole family of daughter molds can be made, all having the same general shape of cube corner element in plan view but having slightly different face configurations. One such daughter mold can incorporate cube corner elements that each have compound faces whose constituent faces are aligned, the compound faces all being mutually perpendicular to the remaining faces of the cube corner element (see e.g. FIG. 14d). Another such daughter mold can incorporate cube corner elements that also have compound faces whose constituent faces are aligned, but the compound faces can differ from orthogonality with remaining faces of the cube corner element. Still another such daughter mold can incorporate cube corner elements that have compound faces whose constituent faces are not aligned (see e.g. FIGS. 14b, 14c). All such daughter molds can be made from a single master mold with a minimal amount of material removed by machining.

Transition Lines

In the preceding figures, transition lines between constituent faces of a compound face have been illustrated as simple lines or dots. Transition lines can in general take on a great variety of forms, depending upon details of the cutting tool used and on the degree to which the motion of the cutting tool is precisely aligned with other faces in the process of forming groove side surfaces. Although in many applications transition lines are an artifact to be minimized, in other applications they can be used to advantage to achieve a desired optical result such as a partially transparent article.

FIG. 15 shows greatly magnified schematic profiles of some possible cutting tools useable with disclosed processes. FIGS. 15(a) and (b) depict half-angle tools, and FIGS. 15(c) and (d) depict full-angle tools. Flattened tips are provided in the tools of FIGS. 15(a) and (c). Sharp-edged tips are provided in those of FIGS. 15(b) and (d). Other possibilities include tools having a rounded or radiused tip. Each of these tools can comprise a synthetic diamond or other suitable hard material as is known to those of skill in the art.

FIG. 16 shows, also in greatly magnified fashion, schematic sectional views depicting the region where two constituent faces of a compound face come together, demonstrating different types of possible transition lines. Each view is along the axis of the respective transition line. In FIG. 16(a), a machined face 104 is formed in near perfect registration with a non-machined face 106, yielding a nearly imperceptible transition line 108a of minimal width. The line may be detectable only by observing a difference in microscopic surface texture between face 104 and 106. In FIG. 16(b), a flat-tipped cutting tool positioned too far into the substrate material produces a small horizontally-disposed flat surface making up transition line 108b. In FIG.

16(c), a cutting tool positioned too far away from the substrate material leaves a small vertically-disposed remnant of the protrusion wall to form transition line 108c. In FIG. 16(d), a sharp-tipped tool positioned too far into the substrate material and too deep produces a jagged transition line 108d. In FIG. 16(e), a sharp-tipped tool that is misaligned when forming groove side surfaces both in the prepared substrate and in a predecessor substrate (from which the prepared substrate is replicated) produces an even more jagged transition line 108e. Transition line 108f of FIG. 16(f) is like line 108e, except that line 108f is made using flat-tipped cutting tools.

Figure 17:
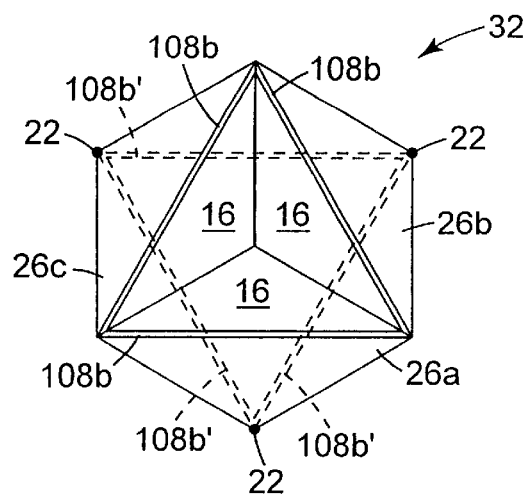
FIG. 17 is a plan view of a PG cube corner cavity in which each transition line between constituent faces has a finite width.

FIG. 17 shows the effect of having transition line 108b (see FIG. 16) in place of idealized transition lines 30 in the structured surface shown earlier in FIGS. 4 and 5. FIG. 17 shows a top plan view of one of the PG cube corner cavities 32. Constituent faces 16 and 26a, 26b, 26c are separated by flat transition lines 108b. Assuming the faces are highly reflective so that cavity 32 is retroreflective, reflections of each transition line will be visible and are shown as 108b'. (Reflections of the three dihedral edges of PG cube corner cavity 32 will also be visible, but are not shown to avoid confusion.) The area taken up by the three lines 108b as well as their counterparts 108b' detracts directly from the area that is effective for retroreflection. Thus, if retroreflective active area is to be maximized, the width of the transition lines will be minimized by carefully controlling the cutting tool position. It may be desirable however to make an article that is not only retroreflective but also behaves like a simple flat mirror, or that is partially transparent. In such cases a transition line such as 108b may be used to achieve such results.

Additional Embodiments

An Embodiment that is not Fully Retroreflective

Figure 18A:
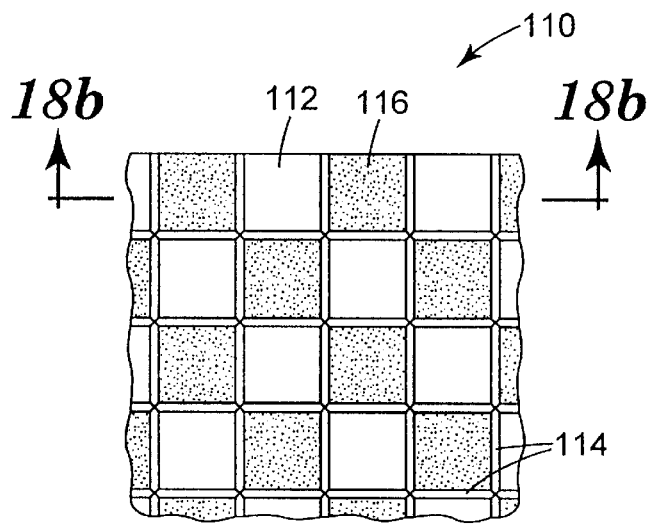
FIG. 18a is a plan view of an initial substrate having an array of four-sided protrusions.
Figure 18B:
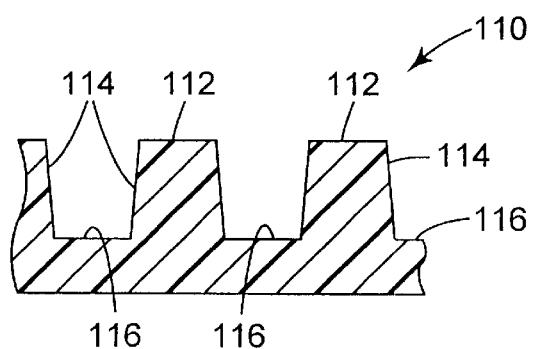
FIG. 18b is a sectional view thereof as indicated.

In FIGS. 18a and 18b, a substrate 110 having an array of four-sided protrusions and cavities is shown. Protrusions are defined by upper surfaces 112 and adjoining sloped side surfaces 114, while cavities are defined by lower surfaces 116 and the adjoining surfaces 114. Depressed flat surfaces are shown shaded in the top plan view of FIG. 18a, as well as in FIG. 19. The surface of substrate 110 can be formed in the same way as that of substrate 58 discussed previously in connection with FIG. 11.

Figure 19:
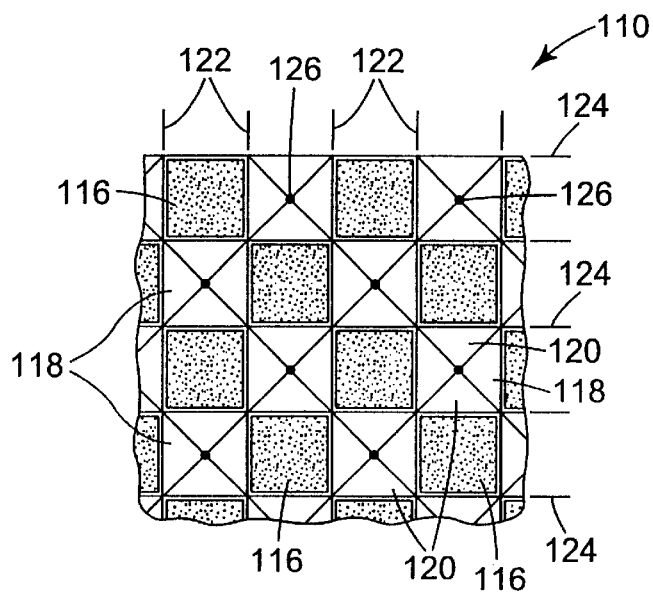
FIG. 19 is a plan view of the substrate of FIGS. 18a–b after forming groove side surfaces in the upper portions of the protrusions.

As shown in FIG. 19, groove side surfaces 118, 120 are formed in the upper portions of the protrusions by the action of cutting tools moving along axes 122, 124 respectively. The groove side surfaces form four-sided pyramids in the protrusions. The pyramid peaks are identified by dots 126. Note that lower surfaces 116 and the lower portions of side surfaces 114 are left intact.

Figure 20A:
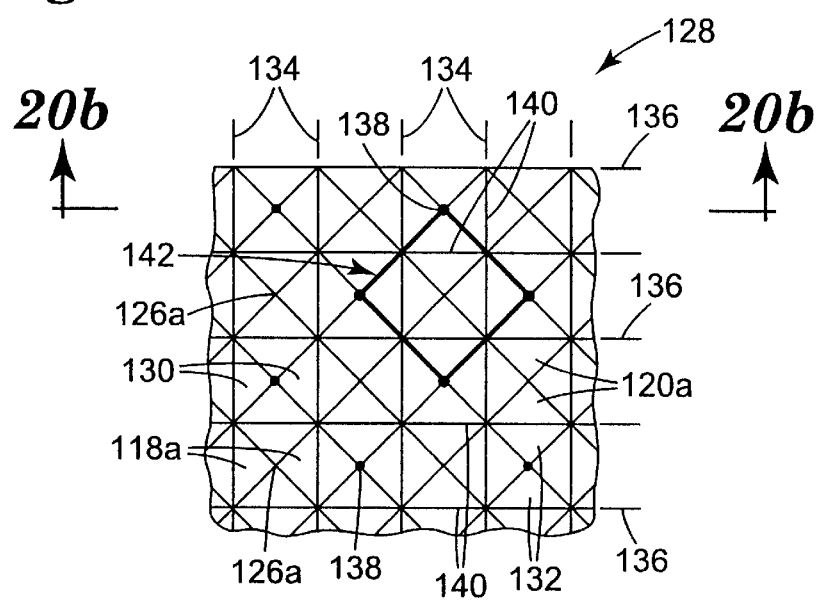
FIG. 20a is a plan view of a substrate obtainable by making a negative copy of the substrate of FIG. 19 and machining groove side surfaces in upper portions of such negative copy.
Figure 20B:
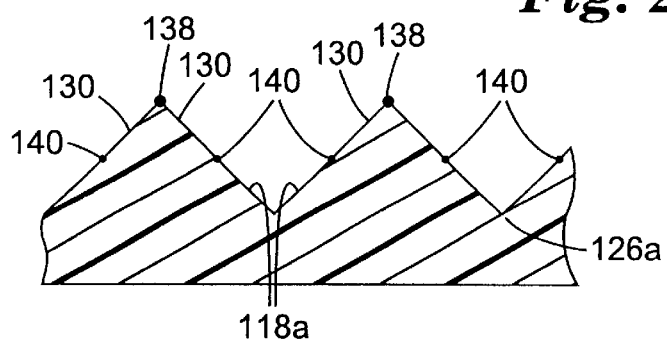

A negative copy of the machined substrate 110 is made using standard replication techniques in a substrate 128. Peaks 126 in substrate 110 produce pits 126a in substrate 128, the pits 126a lying at the bottom of downwardly inclined faces 118a, 120a which correspond respectively to upwardly inclined groove side surfaces 118, 120 of substrate 110. Flat-topped protrusions are formed in substrate 128 by lower surfaces 116, but are shown in FIGS. 20a and 20b after forming groove side surfaces 130, 132 therein by action of a cutting tool along axes 134, 136 respectively. Groove side surfaces 130, 132 are in substantial alignment with adjacent faces 118a, 120a respectively, and form pyramids with pyramid peaks 138. Transition lines 140 separate the machined faces from replicated faces 118a, 120a. Adjacent machined and replicated faces, each of which are three-sided, combine to form four-sided compound faces. Such compound faces define extended geometric structures (both cavities centered at pits 126a and pyramids centered at peaks 138, see outline 142 of a representative extended cavity) that are both wider and deeper than either of the simple pyramids formed from triangular faces 118, 120 in substrate 110 or from triangular faces 130, 132 in substrate 128.

Substrate 128, or positive or negative replicas thereof, can be used for a variety of purposes. If faces 118a are made mutually perpendicular, and likewise for faces 120a, 130, and 132, then the article can function as a so-called flashing retroreflector which is retroreflective only in selected planes of incidence. Such article is retroreflective only for a light source whose direction of incidence lies in a plane perpendicular to the plane of FIG. 20a and parallel either to axes 134 or to axes 136. Such article can be illuminated either from the structured surface side or from the flat side opposite the structured surface, depending upon the details of construction.

Substrate 128 can also be used as an abrasive surface, or as a mold to produce abrasive replicas. For such an application, faces 118a can be made mutually perpendicular, as can faces 120a, 130, and 132, or they can be oriented at smaller or larger angles to yield desired abrasive properties.

An Embodiment Making Partial Use of Laminae

In embodiments disclosed above, the direct machining technique is used together with other techniques such as etching, embossing, replicating, and so on to produce structured surfaces never before associated with direct machining. The example that follows shows how it is possible for the direct machining technique to also be used in conjunction with non-unitary techniques such as the laminate technique. In brief, a prepared substrate is produced by replicating a structured surface formed by a group of laminae whose working surfaces have been machined. The prepared substrate is then directly machined to yield a finished structured surface.

Figure 21:
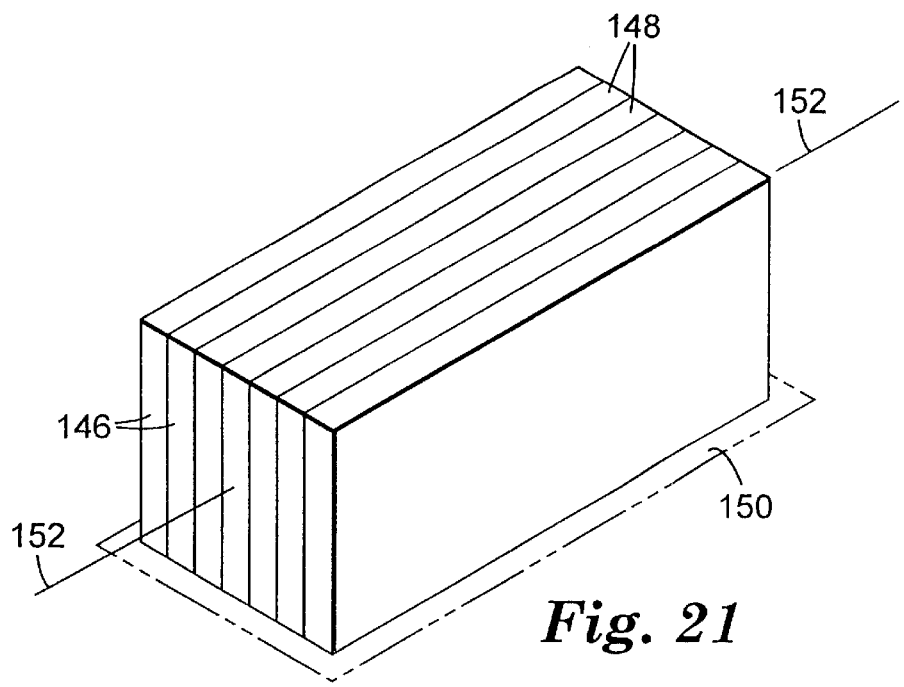
FIG. 21 is a perspective view of a group of laminae.
Figure 22:
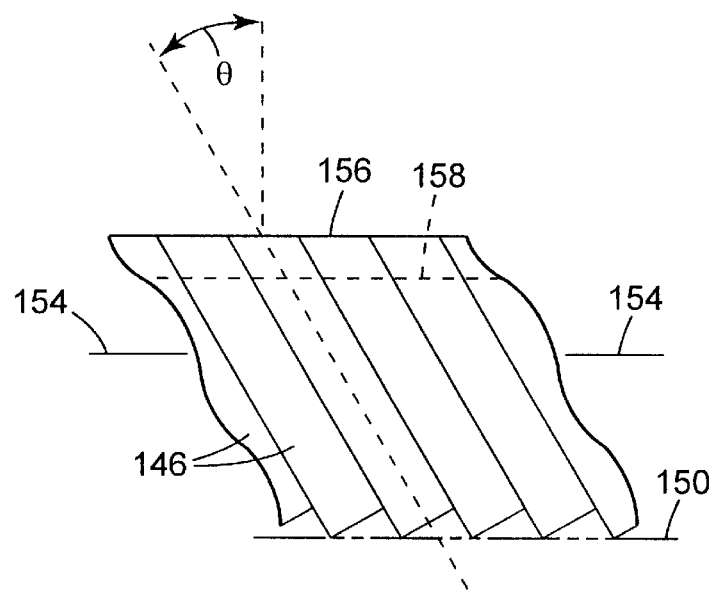
FIG. 22 is an endwise elevational view of the laminae in a tilted position and having a set of grooves machined in the working surfaces thereof.
Figure 23:
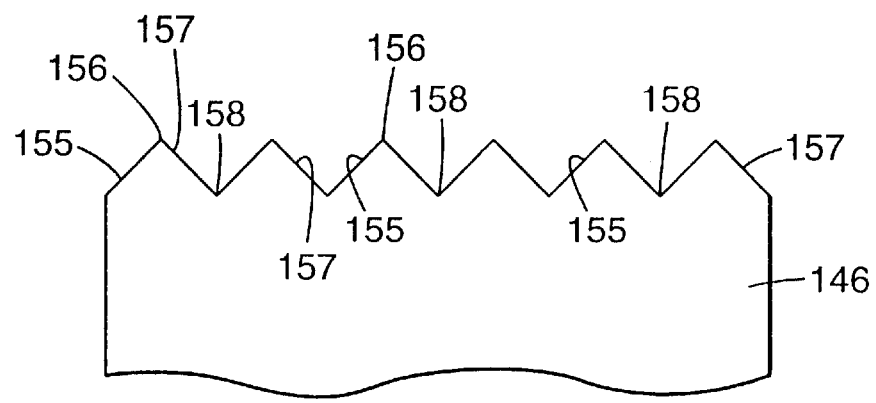
FIG. 23 is a side elevational view of the laminae of FIG. 22.

In FIG. 21, a plurality of individual laminae 146 each having a working surface 148 are held together in a fixture (not shown) that defines a base plane 150. Each lamina is composed of a material suitable for machining smooth burr-free surfaces. The laminae are disposed on and perpendicular to the base plane in FIG. 21. FIG. 22 shows an end elevational view looking down axis 152 after the laminae are tilted or rotated in the fixture about axis 152 by an angle θ, and after a set of adjacent v-shaped grooves is formed in the working surfaces 148 by a cutting tool moving parallel to an axis 154 that is perpendicular to axis 152 and parallel to plane 150. The grooves have groove side surfaces 155, 157 that intersect at upper edges 156 and lower edges 158. FIG. 23 shows a side elevational view of the laminae as viewed along the axis 154. Adjacent groove side surfaces 155, 157 are approximately mutually perpendicular.

Figure 24:
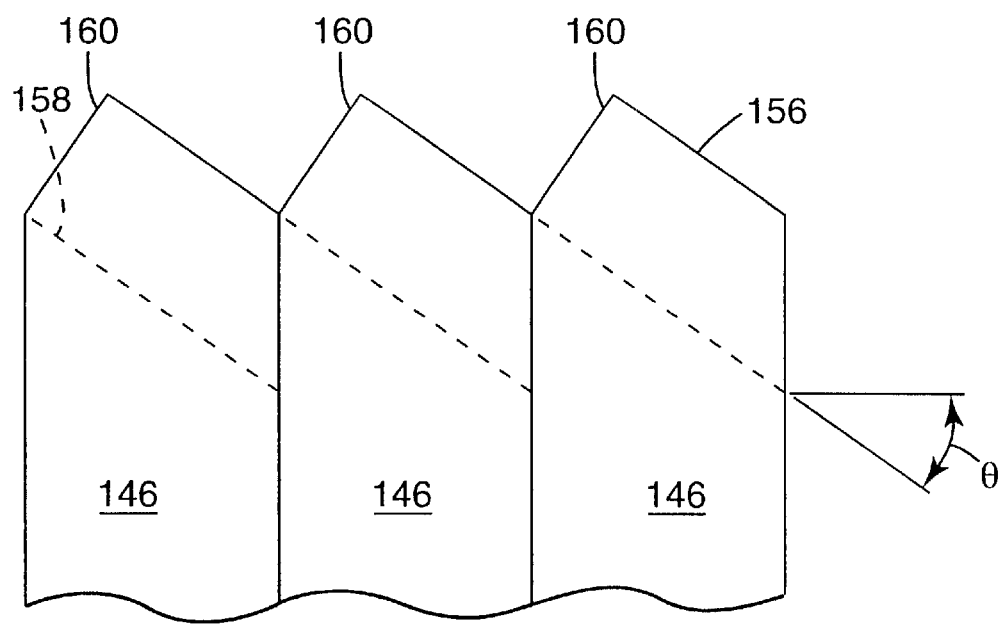
FIG. 24 is a magnified endwise elevational view of the laminae after tilting them back into alignment and machining their working surfaces further.

The laminae are then set upright as in FIG. 21 and an additional groove side surface 160 is formed in the working surface of each laminae by action of a cutting tool moving parallel to axis 152. Surface 160 is formed approximately mutually perpendicular to surfaces 155, 157, thereby defining a row of cube corner pyramids in the working surface of each laminae, each cube corner pyramid comprising one each of surfaces 155, 157, and 160. Finally, every other laminae is offset in a direction parallel to axis 152 such that edges 156 of one lamina line up with edges 158 of its adjacent laminae. A magnified endwise elevational view of three laminae as just described is shown in FIG. 24, the view otherwise corresponding to that of FIG. 22.

Figure 25:
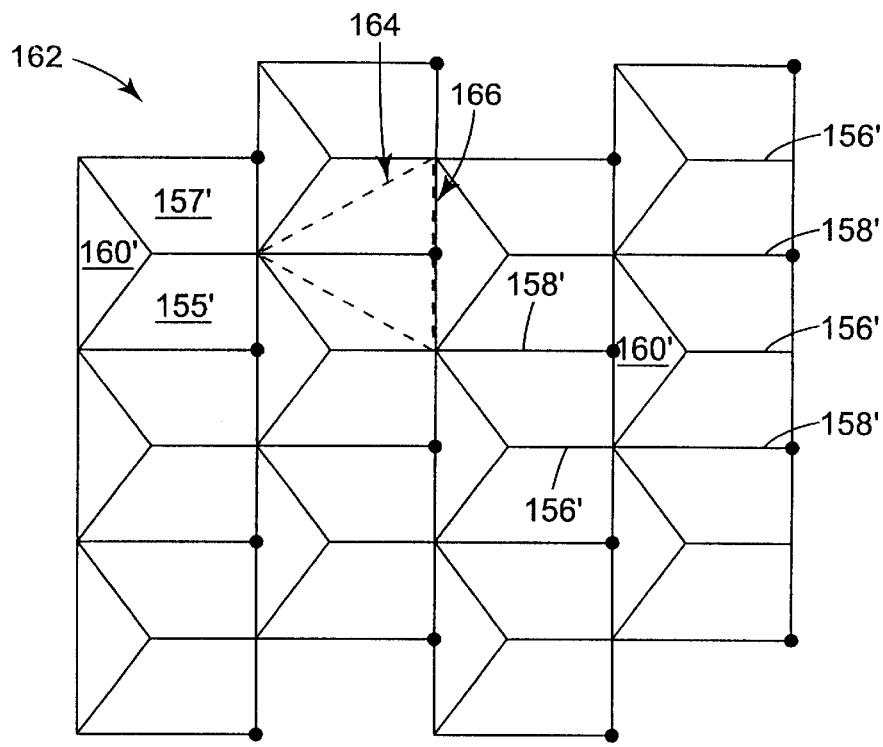
FIG. 25 is a plan view of a structured surface of a prepared substrate, the structured surface being a negative copy of the structured surface formed by the laminae of FIG. 24.

A negative copy of the structured surface produced by the laminae is then made in a unitary substrate 162, a top plan view of which is shown in FIG. 25. Faces and edges corresponding to those of FIG. 24 are identified with the same reference number with the addition of a prime. Since the working surface of the laminae defines cube corner pyramids, the structured surface of substrate 162 has cube corner cavities formed by replicated faces 155', 157', and 160'. Both the cube corner pyramids of FIG. 24 and the cube corner cavities of FIG. 25 are PG cube corner elements because at least one nondihedral edge (158 or 158') is inclined relative to the plane of the structured surface and is parallel to an adjacent nondihedral edge of a neighboring cube corner element. Substrate 162 can be considered a prepared substrate, with an array of cube corner cavities interspersed with an array of protrusions 164, only one of which is outlined in broken lines in FIG. 25. Each protrusion 164 has a triangular base that bounds three triangular faces: an upper portion of face 155'; and upper portion of face 157'; and a substantially vertical face shown at 166 that joins the other two faces.

Direct machining is then performed on prepared substrate 162 to form groove side surfaces 168 in protrusions 164, the groove side surfaces being in substantial alignment with faces 160' and extending along axes that are parallel to the plane of the structured surface. Transition lines 170 also extend along such axes and separate machined faces 168 from replicated faces 160'. Tips or peaks 172 are formed in protrusions 164 at the intersection of machined faces 168 and the remaining portions of replicated faces 155', 157'. Adjacent faces 168 and 160' form a compound face.

Figure 26:
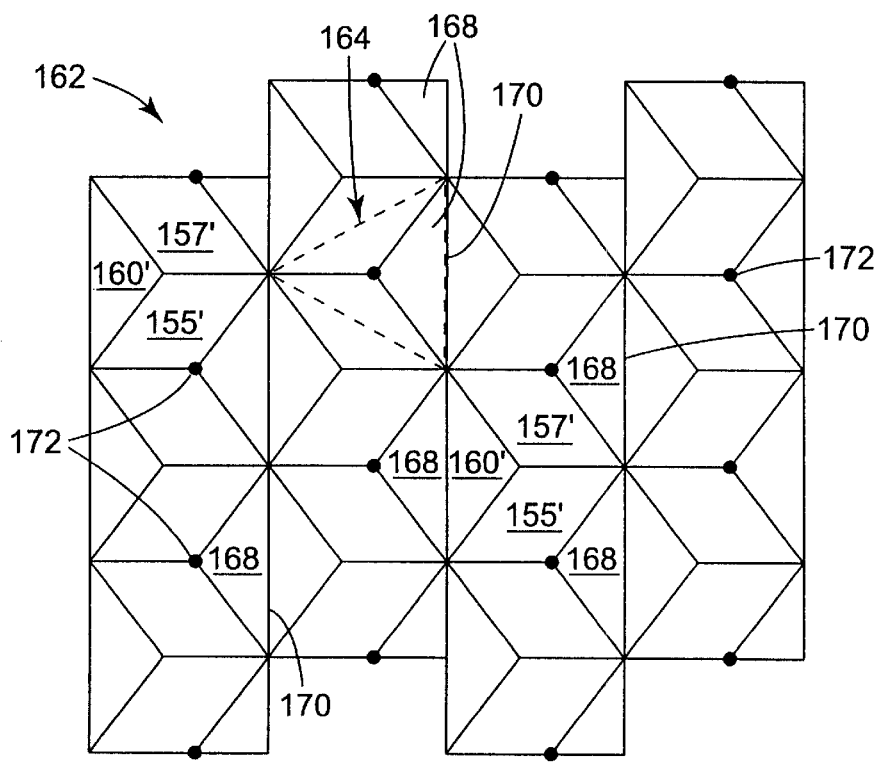
FIG. 26 is the substrate of FIG. 25 after forming groove side surfaces therein.

A comparison of FIG. 26 with FIG. 5 reveals that the structured surface of substrate 162 has PG cube corner elements, both PG cube corner pyramids and PG cube corner cavities, just as substrate 10 does. Also apparent is the fact that whereas cube corner elements of substrate 10 included three compound faces, each comprising two constituent faces disposed on opposed sides of a transition line, cube corner elements of substrate 162 have only one compound face. Finally, the structured surface of FIG. 26 is seen to comprise an array of threesided pyramids 164 having one machined face 168, and an array of cavities defined by non-machined faces, the cavities comprising the remainder of the structured surface (the portions of faces 155', 157', 160' that lie below the plane defined by transition lines 170), and each pyramid disposed proximate to and at least partially extending above one of the cavities.

Figure 27:
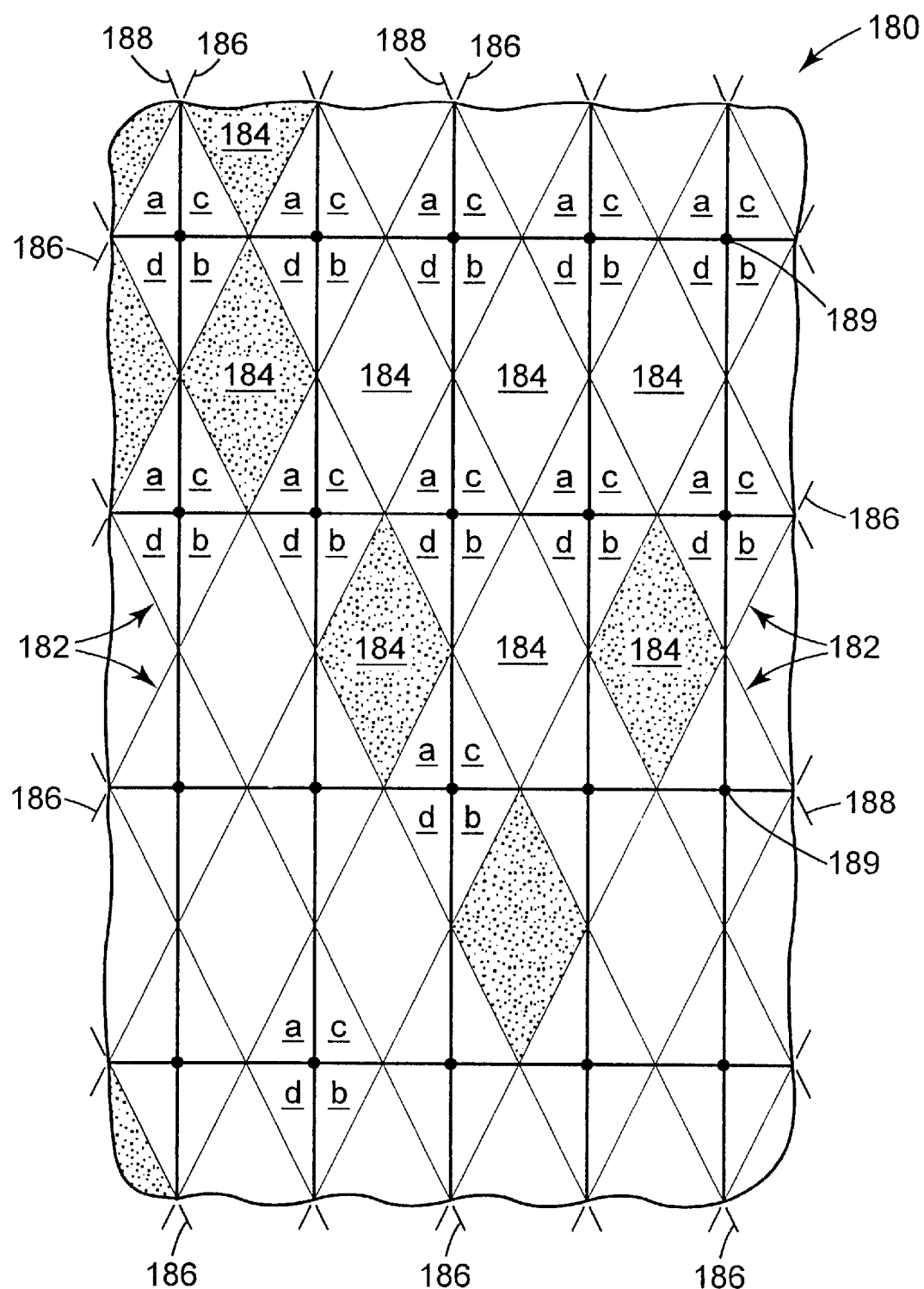
FIG. 27 is a top plan view of an initial substrate after forming groove side surfaces in upper portions of protrusions.
Figure 28:
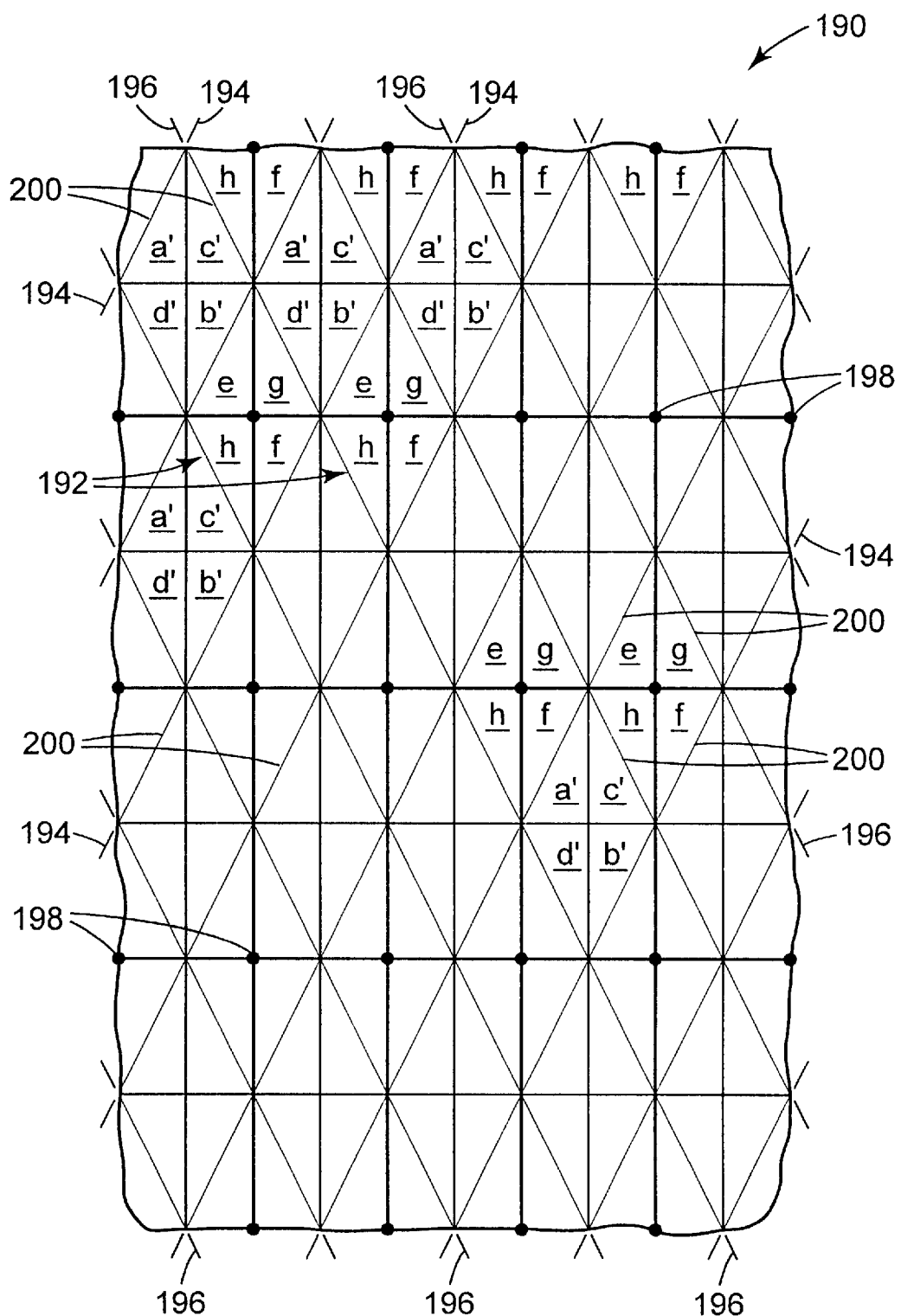
FIG. 28 is a plan view of a substrate obtainable by making a negative copy of the substrate of FIG. 27 and machining groove side surfaces in upper portions of such negative copy.
Figure 29:
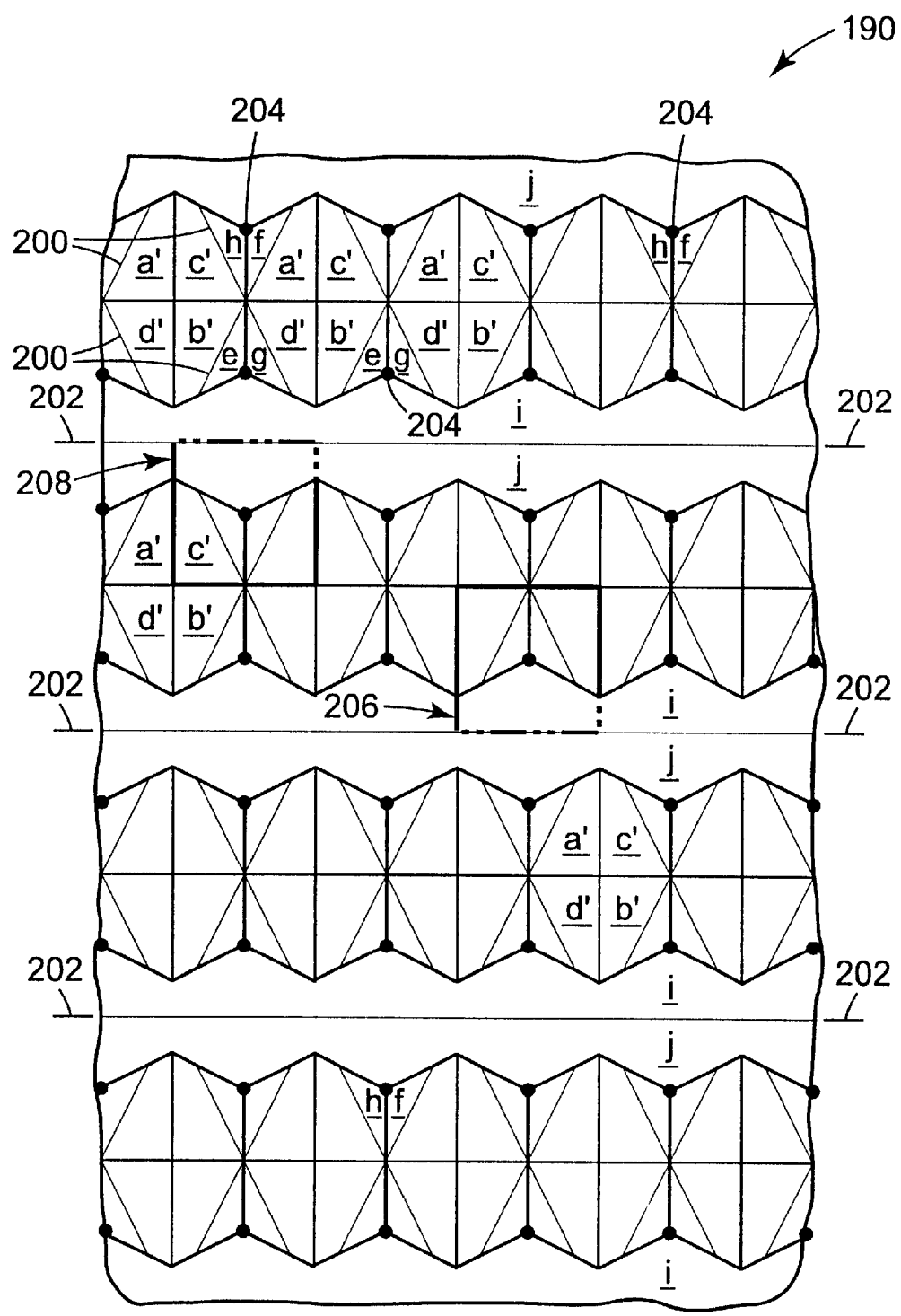
FIG. 29 is a plan view of the substrate of FIG. 28 after machining an additional set of parallel grooves therein.

Embodiments Having Optically Opposed Cube Corner Pyramids without Cube Corner Cavities Another embodiment is shown by the sequence of FIGS. 27–29. FIG. 27 shows a plan view of an initial substrate 180 having a structured surface comprising an array of protrusions 182 and cavities 184 (shown shaded), the cavities 184 being bordered by substantially vertical walls of the protrusions 182. Substrate 180 is similar to the substrate of FIG. 12, except that the protrusions and cavities of substrate 180 are four-sided diamond shapes in horizontal cross section rather than triangles. Groove side surfaces a, b as well as c, d have been formed in the substrate by the action of cutting tools along axes 186 and 188 respectively. Axes 186, 188 are parallel to the plane of the structured surface, thus ensuring that side surfaces a, b, c, d all extend along axes parallel to such plane. The geometry of the cutting tool is selected to configure surfaces "a" substantially perpendicular to surfaces c, and to configure surfaces b substantially perpendicular to surfaces d. Each protrusion 182 thus has four faces a, b, c, d that are inclined relative to the plane of the structured surface and that meet at an elevated peak identified by a dot 189. Note that faces a, b, c, d do not form a cube corner element.

A negative copy of this structured surface is then, by electroforming or other suitable means, made in a substrate 190 referred to herein as a prepared substrate. Faces a–d of initial substrate 180 form replicated faces a'–d' in prepared substrate 190. Cavities 184 of substrate 180 form protrusions 192 in substrate 190, such protrusions shown in FIG. 28 after groove side surfaces e, f, g, h have been formed therein by cutting tools moving along axes 194, 196. The cutting tools are controlled to form such surfaces substantially parallel to and in substantial registration with the respective replicated faces so that pairs of individual faces a' and f, b' and e, c' and h, and d' and g form compound faces, respectively designated face a'f, face b'e, face c'h, and face d'g. The faces a'f are substantially perpendicular to faces c'h, and faces b'e are substantially parallel to faces d'g. Dots 198 locate the peaks of pyramids formed by faces e, f, g, h. Transition lines 200, all disposed substantially in a common transition plane parallel to the plane of the figure, separate machined faces e–h from non-machined faces a'–d'.

FIG. 29 depicts substrate 190 after forming therein a set of parallel grooves comprising opposed groove side surfaces i and j by action of a cutting tool along axes 202 as shown. In the embodiment shown, surfaces i and j are inclined at the same angle relative to the normal to the structured surface, although this is by no means required. Such grooves extend deeper into substrate 190 than transition lines 200, preferably extending to a depth about equal to the local minima disposed at the intersection of faces a', b', c', d'. The cutting tools remove the highest portions of the structured surface, shifting the uppermost peaks from points 198 (FIG. 28) to points 204.

Surface i is configured to be substantially perpendicular to compound faces b'e and d'g, thus forming one group of PG cube corner pyramids labeled 206. Surface j is configured to be substantially perpendicular to compound faces a'f and c'h, forming another group of PG cube corner pyramids labeled 208. Pyramids 206, 208 are matched pairs of cube corner elements because one corresponds to a 180 degree rotation of the other about an axis perpendicular to the structured surface, and because there is a one-to-one correspondence of pyramids 206 to pyramids 208. Note that each pyramid 206, 208 has exactly two faces that are compound. Note also that the structured surface contains no cube corner cavities. However, truncated non-machined faces a', b', c', d' do form cavities, and pyramids formed by machined faces e, g, and i, or by machined faces h, f, and j, are arranged on the structured surface such that a plurality of such pyramids border a given cavity.

Figure 30:
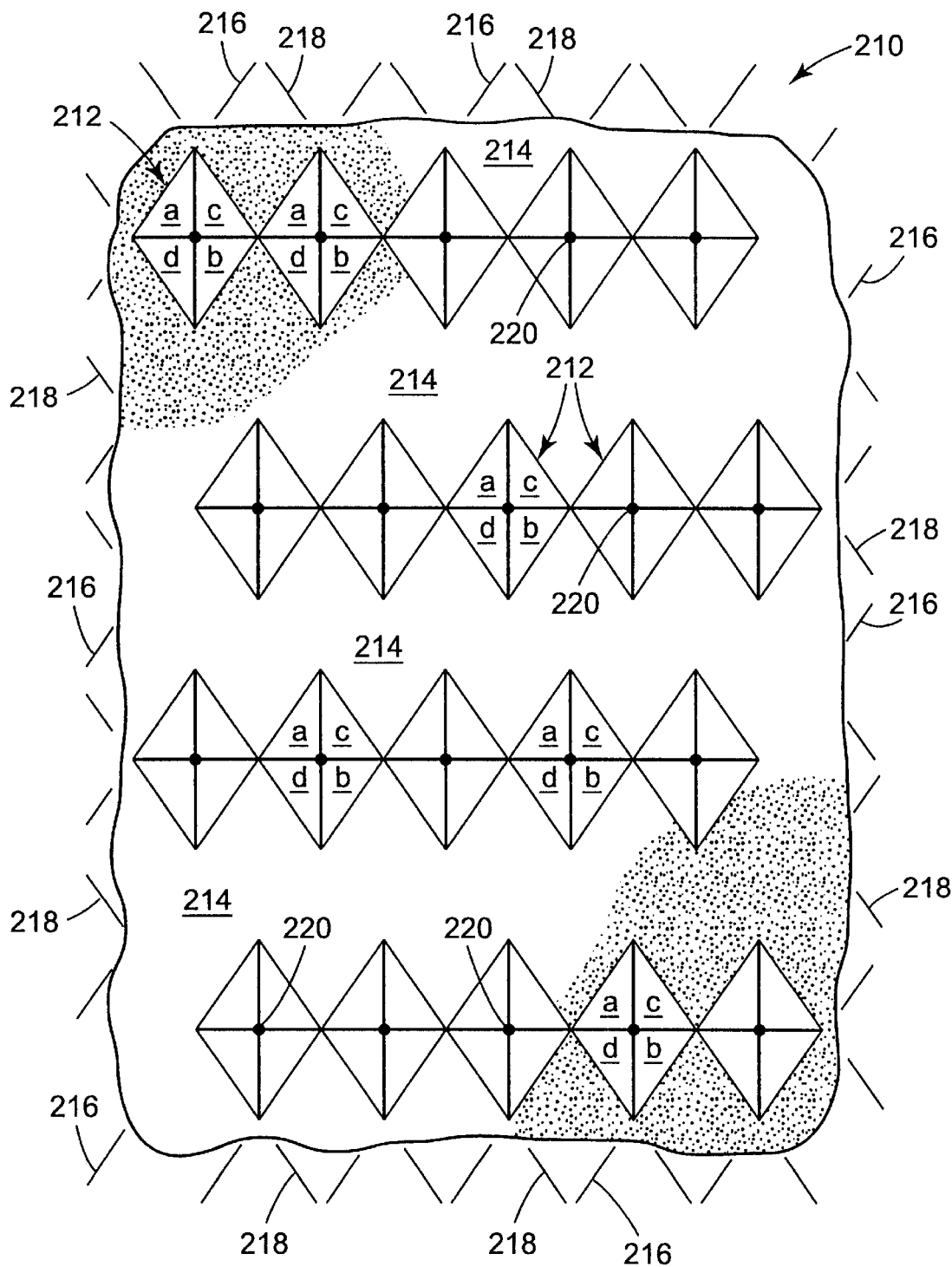
FIGS. 30–32 show an alternative embodiment in an analogous fashion to FIGS. 27–29.
Figure 31:
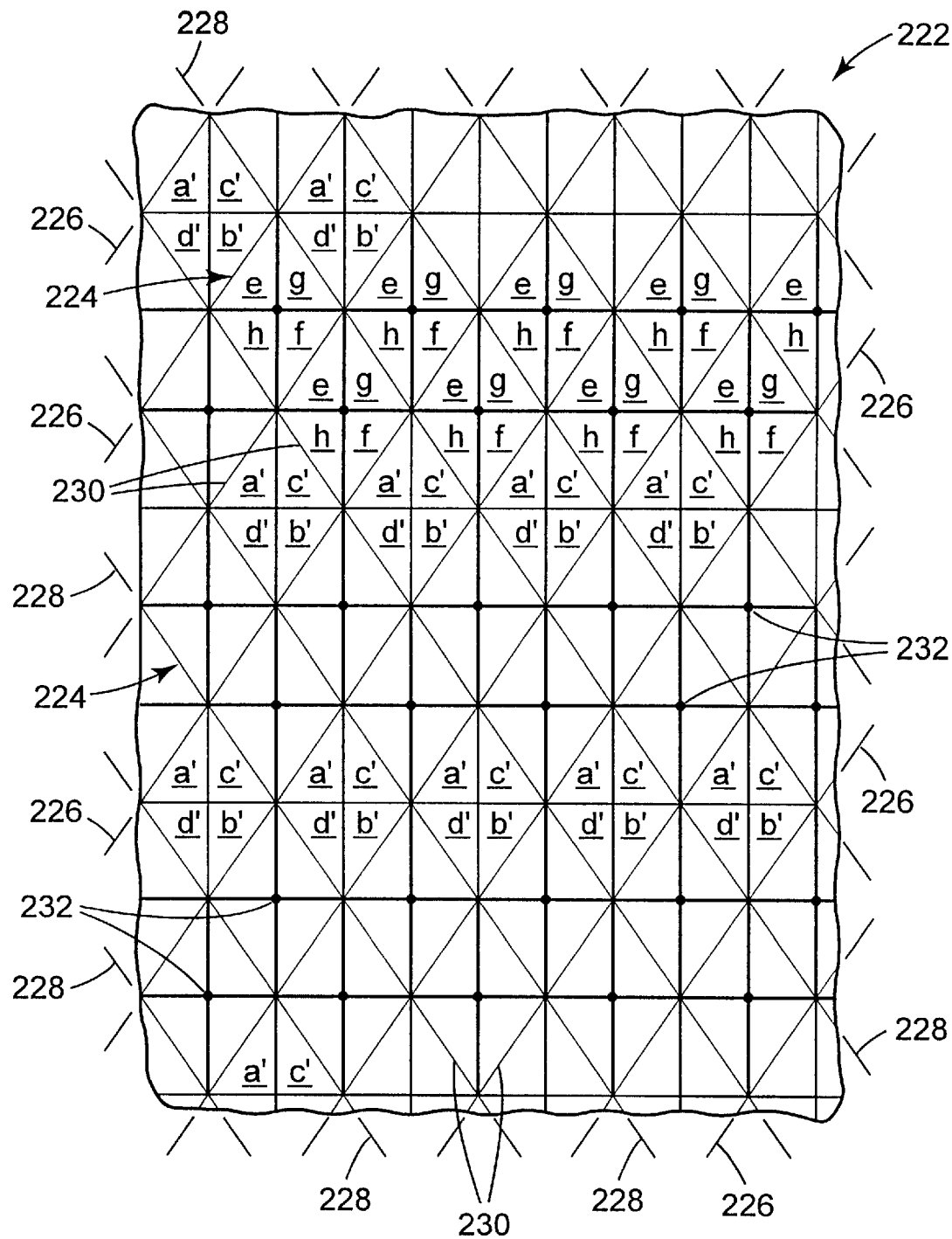
Figure 32:
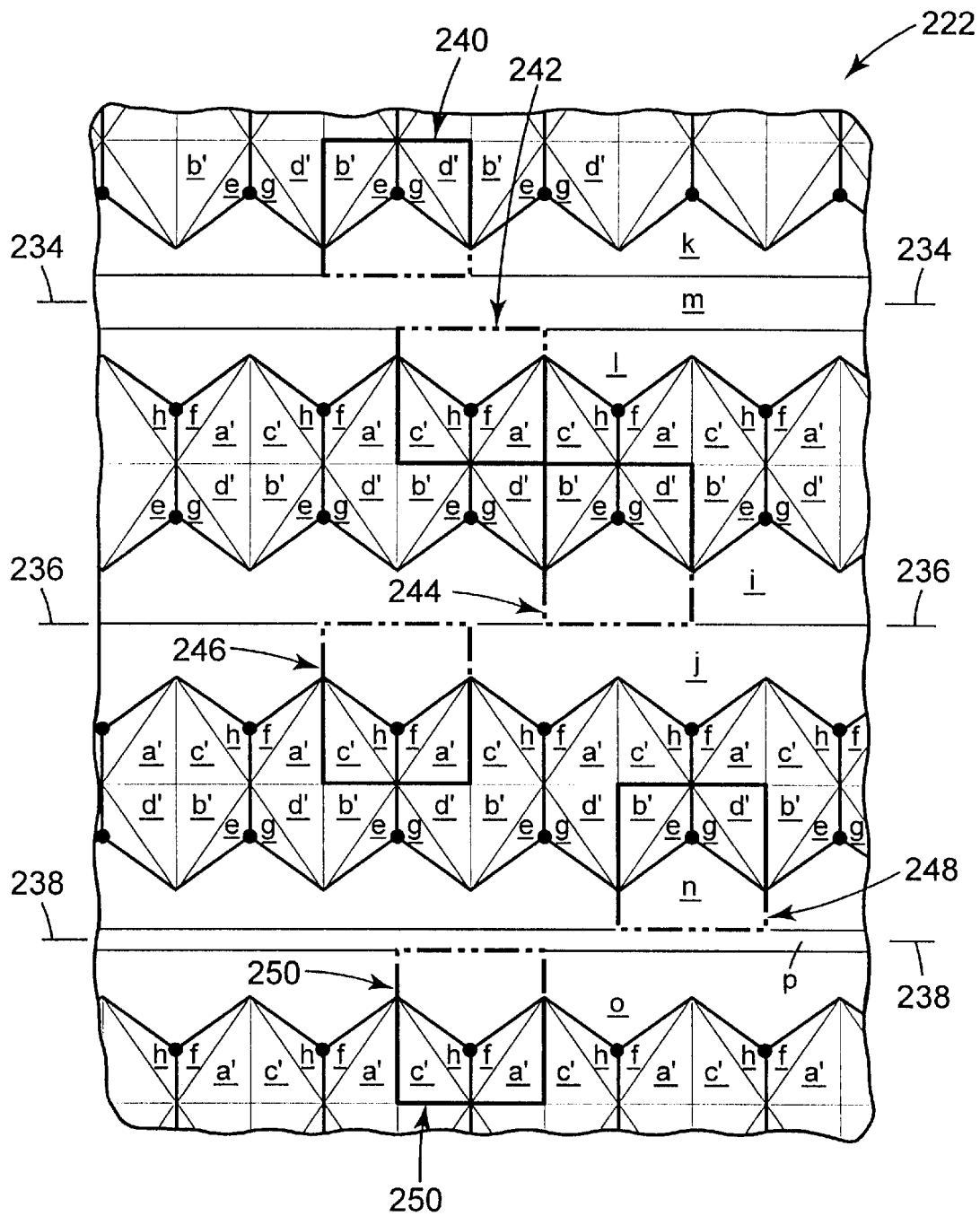

The sequence of FIGS. 30–32 depict a variation of the embodiment just described. In FIG. 30, an initial substrate 210 has an array of protrusions 212 and cavities 214 (shown shaded) therein, with groove side surfaces a, b, c, d formed in the upper portions of the protrusions by cutting tools acting along axes 216, 218. Lower portions of the protrusions have substantially vertical walls, not visible in top plan view. Cavities 214 extend to and are bordered by such vertical walls of a large number of protrusions because such protrusions do not form a fully interconnected array in plan view, as in previous figures, but rather only a partially interconnected array. Cavities 214 can thus be referred to as "open" cavities rather than "closed" cavities, as they are not substantially entirely bounded by protrusion walls on all sides. As before, surfaces "a" are perpendicular to surfaces c, and surfaces b are perpendicular to surfaces d. Points 220 locate the peaks of the pyramids formed by surfaces a, b, c, d.

FIG. 31 shows a negative copy of the structured surface in another substrate 222. Faces a–d produce replicated faces a'–d'. Cavities 214 produce extended protrusions 224, on which have been formed groove side surfaces e, f, g, h by action of one or more cutting tools along axes 226, 228, the cutting tools controlled to form surfaces e, f, g, h coplanar with surfaces b', a', d', c' respectively thus forming compound faces a'f, b'e, c'h, and d'g. Transition lines 230 separate machined faces e–h from non-machined faces a'–d'. Points 232 locate the peaks of pyramids formed by these compound faces.

FIG. 32 shows substrate 222 after forming a set of three different parallel grooves therein along axes 234, 236, 238. The groove along axis 236 is formed by a sharp-edged tool such as that of FIG. 15b or FIG. 15d and comprises opposed groove side surfaces i and j. The grooves along axes 234 and 236 are formed with tools having flattened tips such as that of FIG. 15a or 15c. Opposed groove side surfaces k and incline upwardly from flat groove bottom m, as do groove side surfaces n and o from flat groove bottom p. Surfaces i, k, and n are parallel to each other and perpendicular to compound faces b'e and d'g. Surfaces j, l, and o are parallel to each other and perpendicular to compound faces a'f and c'h. This geometry results in six different types of PG cube corner pyramids on the structured surface: pyramids 240, having faces k, b'e, and d'g; pyramids 242, having faces e, a'f, and c'h; pyramids 244, having faces i, b'e, and d'g; pyramids 246, having faces j, a'f, and c'h; pyramids 248, having faces n, b'e, and d'g; and pyramids 250, having faces o, a'f, and c'h. Pyramids 240 and 242 are matched pairs, as are pyramids 244, 246, and pyramids 248, 250. The depth of the final set of parallel grooves is adjusted so that the peaks of the cube corner pyramids 240, 242, 244, 246, 248, and 250 are all disposed at the same elevation, although this is not required. Thus, the groove along axis 236 has the deepest groove bottom, the groove along axis 234 has the shallowest groove bottom (m), and the groove along axis 238 has a groove bottom (p) of intermediate depth.

The use of grooves having different groove bottoms as shown impacts the optical performance of retroreflective articles made from the structured surface of substrate 222. First, flat groove bottoms m, p produce flat features in the retroreflective article that can act as windows, making the article partially transparent. Second, the various groove geometries affect the so-called aspect ratio of the cube corner elements, which in turn impacts retroreflective performance as a function of viewing angle. Aspect ratio as used herein relates to the degree of elongation of the outline of a cube corner element seen in top plan view. For example, the PG cube corner pyramid 244 shown in bold outline has a left and a right edge that are separated by a given width, and an upper and a lower edge that are separated by a given length. The ratio of length to width is the aspect ratio for that particular cube corner element. It can be readily seen that the PG cube corner pyramids of substrate 222 all have the same width but that pyramids 244 and 246 have the greatest length, pyramids 240 and 242 have the shortest length, and pyramids 248 and 250 have an intermediate length. Adjustment of the aspect ratio of the cube corner apertures is desirable because it can tailor the divergence profile (for a fixed source position, the amount of retroreflected light as a function of viewing angle) and the entrance angularity (for a fixed viewing angle, the amount of retroreflected light as a function of source position) of the cube corner article.

Providing grooves with flat groove bottoms as shown in FIG. 32 have an additional benefit when such flat groove bottoms are deeper in the substrate than the sharp recessed points or edges located at the intersection of other faces. In such case, negative copies of the substrate, which can be joined together to scale-up a larger mold, will be more robust and less prone to damage because the highest features on the surface of the negative copies will be flat-topped ridges. Placing such a negative copy face-down on a flat surface, the flat-topped ridges will themselves experience little damage because of their large surface area, and further will protect sharp points or ridges formed by neighboring faces from damage due to contact with such flat surface.

Cube corner elements of FIGS. 29 and 32 can be canted or uncanted as desired. Producing cube corner elements that are canted to a greater or lesser degree is accomplished by tailoring the shape of the diamond-shaped protrusions (FIGS. 27, 30) and then the orientation of the groove side surfaces (a, b, c, d, e, f, g, h, i, j, etc.) to be in conformance with the desired degree of canting. It has already been noted that the techniques used to make the embodiments of FIGS. 29 and 32 produce matched pairs of optically opposed cube corner elements. If canting is used, then such matched pairs can, in keeping with principles discussed in U.S. Pat. No. 4,588,258 (Hoopman), U.S. Pat. No. 5,812,315 (Smith et al.), and U.S. Pat. No. 5,822,121 (Smith et al.), give rise to widened retroreflective angularity so that an article having the structured surface will be visible over a widened range of entrance angles.

Turning again to FIG. 32, the structured surface shown there can be viewed, similar to the surfaces of FIGS. 4, 5, 6, 7, 8, 12, 14b, 14d, 19, 20a, 20b, 26, 27, 28, and 29, 30, 31, as comprising cavities formed by non-machined faces and pyramids formed at least in part by machined faces, each of the pyramids disposed proximate to at least one of the cavities. The truncated non-machined faces a', b', c', d' in FIG. 32 form the cavities, and the pyramids are formed by machined faces e, g, and one of k, i, or n, or by machined faces h, f, and one of l, j, or o.

Discussion

The working surface of the mold substrates can have any suitable physical dimensions, with selection criteria including the desired size of the final mold surface and the angular and translational precision of the machinery used to cut the groove surfaces. The working surface has a minimum transverse dimension that is greater than two cube corner elements, with each cube corner element having a transverse dimension and/or cube height preferably in the range of about 25 µm to about 1 mm, and more preferably in the range of about 25 µm to about 0.25 mm. The working surface is typically a square several inches on a side, with four inch (10 cm) sides being standard. Smaller dimensions can be used to more easily cut grooves in registration with non-machined surfaces over the whole structured surface. The substrate thickness can range from about 0.5 to about 2.5 mm. (The measurements herein are provided for illustrative purposes only and are not intended to be limiting.) A thin substrate can be mounted on a thicker base to provide rigidity. Multiple finished molds can be combined with each other e.g. by welding in known tiling arrangements to yield a large tiled mold that can then be used to produce tiled retroreflective products.

In the manufacture of retroreflective articles such as retroreflective sheeting, the structured surface of the machined substrate is used as a master mold which can be replicated using electroforming techniques or other conventional replicating technology. The structured surface can include substantially identical cube corner elements or can include cube corner elements of varying sizes, geometries, or orientations. The structured surface of the replica, sometimes referred to in the art as a 'stamper', contains a negative image of the cube corner elements. This replica can be used as a mold for forming a retroreflective article. More commonly, however, a large number of suitable replicas are assembled side-by-side to form a tiled mold large enough to be useful in forming tiled retroreflective sheeting. Retroreflective sheeting can then be manufactured as an integral material, e.g. by embossing a preformed sheet with an array of cube corner elements as described above or by casting a fluid material into a mold. See, JP 8-309851 and U.S. Pat. No. 4,601,861 (Pricone). Alternatively, the retroreflective sheeting can be manufactured as a layered product by casting the cube corner elements against a preformed film as taught in PCT application No. WO 95/11464 (Benson, Jr. et al.) and U.S. Pat. No. 3,684,348 (Rowland) or by laminating a preformed film to preformed cube corner elements. By way of example, such sheeting can be made using a nickel mold formed by electrolytic deposition of nickel onto a master mold. The electroformed mold can be used as a stamper to emboss the pattern of the mold onto a polycarbonate film approximately 500 $\mu$m thick having an index of refraction of about 1.59. The mold can be used in a press with the pressing performed at a temperature of approximately 175° to about 200° C.

The various mold substrates discussed above can generally be categorized into two groups: replicated substrates, which receive at least part of their structured surface by replication from a prior substrate, and bulk substrates, which do not. The substrate shown in FIG. 9 is an example of a bulk substrate, as are the laminae 146 of FIGS. 21–24. Replicated substrates can be further categorized into those whose structured surface is subsequently machined—such as prepared substrate 10 of FIGS. 2–5, substrate 58 of FIGS. 11–12, prepared substrate 68 of FIG. 13, substrate 90 of FIG. 14b, prepared substrate 94 of FIGS. 14c–14d, substrate 110 of FIGS. 18a–b and 19, substrate 128 of FIGS. 20a–b, prepared substrate 162 of FIGS. 25–26, substrate 180 of FIG. 27, substrate 190 of FIGS. 28–29, substrate 210 of FIG. 30, and substrate 222 of FIGS. 31–32—and those whose structured surface is not subsequently machined, such as the final mold that is used for embossing or casting-and-curing retroreflective sheeting.

Suitable materials for use with bulk mold substrates are well known to those of ordinary skill in the art, and generally include any material that can be machined cleanly without burr formation and that maintains dimensional accuracy after groove formation. A variety of materials such as machinable plastics or metals may be utilized. Acrylic is an example of a plastic material; aluminum, brass, electroless nickel, and copper are examples of useable metals.

Suitable materials for use with replicated mold substrates that are not subsequently machined are well known to those of ordinary skill in the art, and include a variety of materials such as plastics or metals that maintain faithful fidelity to the prior structured surface. Thermally embossed or cast plastics such as acrylic or polycarbonate can be used. Metals such as electrolytic nickel or nickel alloys are also suitable.

Suitable materials for use with replicated mold substrates whose structured surface is subsequently machined are also well known to those of ordinary skill in the art. Such materials should have physical properties such as low shrinkage or expansion, low stress, and so on that both ensure faithful fidelity to the prior structured surface and that lend such materials to diamond machining. A plastic such as acrylic (PMMA) or polycarbonate can be replicated by thermal embossing and then subsequently diamond machined. Suitable hard or soft metals include electrodeposited copper, electroless nickel, aluminum, or composites thereof.

With respect to retroreflective sheetings made directly or indirectly from such molds, useful sheeting materials are preferably materials that are dimensionally stable, durable, weatherable and readily formable into the desired configuration. Examples of suitable materials include acrylics, which generally have an index of refraction of about 1.5, such as Plexiglas resin from Rohm and Haas; thermoset acrylates and epoxy acrylates, preferably radiation cured, polycarbonates, which have an index of refraction of about 1.6; polyethylene-based ionomers (marketed under the name 'SURLYN'); polyesters; and cellulose acetate butyrates. Generally any optically transmissive material that is formable, typically under heat and pressure, can be used. Other suitable materials for forming retroreflective sheeting are disclosed in U.S. Pat. No. 5,450,235 (Smith et al.). The sheeting can also include colorants, dyes, UV absorbers, or other additives as needed.

It is desirable in some circumstances to provide retroreflective sheeting with a backing layer. A backing layer is particularly useful for retroreflective sheeting that reflects light according to the principles of total internal reflection. A suitable backing layer can be made of any transparent or opaque material, including colored materials, that can be effectively engaged with the disclosed retroreflective sheeting. Suitable backing materials include aluminum sheeting, galvanized steel, polymeric materials such as polymethyl methacrylates, polyesters, polyamids, polyvinyl fluorides, polycarbonates, polyvinyl chlorides, polyurethanes, and a wide variety of laminates made from these and other materials.

The backing layer or sheet can be sealed in a grid pattern or any other configuration suitable to the reflecting elements. Sealing can be affected by use of a number of methods including ultrasonic welding, adhesives, or by heat sealing at discrete locations on the arrays of reflecting elements (see, e.g. U.S. Pat. No. 3,924,928). Sealing is desirable to inhibit the entry of contaminants such as soil and/or moisture and to preserve air spaces adjacent the reflecting surfaces of the cube corner elements.

If added strength or toughness is required in the composite, backing sheets of polycarbonate, polybutryate or fiber-reinforced plastic can be used. Depending upon the degree of flexibility of the resulting retroreflective material, the material can be rolled or cut into strips or other suitable designs. The retroreflective material can also be backed with an adhesive and a release sheet to render it useful for application to any substrate without the added step of applying an adhesive or using other fastening means.

Glossary of Selected Terms

An "array of neighboring cube corner elements" means a given cube corner element together with all adjacent cube corner elements bordering it.

"Closed cavity" means a cavity that is substantially entirely bounded by walls of protrusions or pyramids on all sides.

"Compound face" means a face composed of at least two distinguishable faces (referred to as "constituent faces")

that are proximate each other. The constituent faces are substantially aligned with one another, but they can be offset translationally and/or rotationally with respect to each other by relatively small amounts (less than about 10 degrees of arc, and preferably less than about 1 degree of arc) to achieve desired optical effects as described herein.

"Cube corner cavity" means a cavity bounded at least in part by three faces arranged as a cube corner element.

"Cube corner element" means a set of three faces that cooperate to retroreflect light or to otherwise direct light to a desired location. Some or all of the three faces can be compound faces. "Cube corner element" also includes a set of three faces that itself does not retroreflect light or otherwise direct light to a desired location, but that if copied (in either a positive or negative sense) in a suitable substrate forms a set of three faces that does retroreflect light or otherwise direct light to a desired location.

"Cube corner pyramid" means a mass of material having at least three side faces arranged as a cube corner element.

"Cube height" means, with respect to a cube corner element formed on or formable on a substrate, the maximum separation along an axis perpendicular to the substrate between portions of the cube corner element.

"Dihedral edge" of a cube corner element is an edge of one of the three faces of the cube corner element that adjoins one of the two other faces of the same cube corner element. Note that any particular edge on a structured surface may or may not be a dihedral edge, depending upon which cube corner element is being considered.

"Direct machining" refers to forming in the plane of a substrate one or more groove side surfaces typically by drawing a cutting tool along an axis substantially parallel to the plane of the substrate.

"Geometric structure" means a protrusion or cavity having a plurality of faces.

"Groove" means a cavity elongated along a groove axis and bounded at least in part by two opposed groove side surfaces.

"Groove side surface" means a surface or series of surfaces capable of being formed by drawing one or more cutting tools across a substrate in a substantially continuous linear motion. Such motion includes fly-cutting techniques where the cutting tool has a rotary motion as it advances along a substantially linear path.

"Non-machinable" means, with respect to a structured surface that extends along a reference plane, that such structured surface cannot be fabricated simply by drawing a cutting tool along paths substantially parallel to the reference plane.

"Nondihedral edge" of a cube corner element is an edge of one of the three faces of the cube corner element that is not a dihedral edge of such cube corner element. Note that any particular edge on a structured surface may or may not be a nondihedral edge, depending upon which cube corner element is being considered.

"PG cube corner element" stands for "preferred geometry" cube corner element, and is defined in the context of a structured surface of cube corner elements that extends along a reference plane. For the purposes of this application, a PG cube corner element means a cube corner element that has at least one nondihedral edge that: (1) is nonparallel to the reference plane; and (2) is substantially parallel to an adjacent nondihedral edge of a neighboring cube corner element. A cube corner element whose three reflective faces are all rectangles (inclusive of squares) is one example of a PG cube corner element.

"Prepared substrate" means a substrate that has a plurality of faces corresponding to only portions of a desired or final structured surface.

"Protrusion" has its broad ordinary meaning, and can comprise a pyramid.

"Pyramid" means a protrusion having three or more side faces that meet at a vertex, and can include a frustum.

"Reference plane" means a plane or other surface that approximates a plane in the vicinity of a group of adjacent cube corner elements or other geometric structures, the cube corner elements or geometric structures being disposed along the plane.

"Retroreflective" means having the characteristic that obliquely incident incoming light is reflected in a direction antiparallel to the incident direction, or nearly so, such that an observer at or near the source of light can detect the reflected light.

"Structured" when used in connection with a surface means a surface that has a plurality of distinct faces arranged at various orientations.

"Symmetry axis" when used in connection with a cube corner element refers to a vector that originates at the cube corner apex and forms an equal acute angle with the three faces of the cube corner element. It is also sometimes referred to as the optical axis of the cube corner element.

"Transition line" means a line or other elongated feature that separates constituent faces of a compound face.

All patents and patent applications referred to herein are incorporated by reference. Although the present invention has been described with reference to preferred embodiments, workers skilled in the art will recognize that changes can be made in form and detail without departing from the spirit and scope of the invention.

What is claimed is:

1. A geometric structure having a plurality of faces and disposed on a structured surface, wherein at least one of the faces is a compound face comprising a machined portion and a non-machined portion, wherein the machined portion is substantially aligned with the non-machined portion and wherein the machined and non-machined portions have angular orientations that differ by less than 10 degrees of arc.

2. The geometric structure of claim 1, wherein the geometric structure comprises a cube corner element that has as one of its faces the compound face.

3. The geometric structure of claim 1, wherein the geometric structure is selected from the group consisting of a four-sided pyramid and a four-sided cavity.

4. The geometric structure of claim 1, wherein the geometric structure is selected from the group consisting of a three-sided pyramid and a three-sided cavity.

5. The geometric structure of claim 1, wherein the machined and non-machined portions have angular orientations of less than 1 degree.

6. The geometric structure of claim 2, wherein the non-machined portion is a replicated portion.

7. The geometric structure of claim 2, wherein the non-machined portion is an embossed portion.

8. The geometric structure of claim 2, wherein the compound face has a transition line separating the machined portion from the non-machined portion.

9. The geometric structure of claim 2, wherein the cube corner element has a substantially hexagonal outline in plan view.

10. The geometric structure of claim 2, wherein the cube corner element has a substantially rectangular outline in plan view.

11. The geometric structure of claim 2, wherein exactly one of the faces of the cube corner element is compound.

12. The geometric structure of claim 2, wherein exactly two of the faces of the cube corner element are compound.

13. The geometric structure of claim 2, wherein exactly three of the faces of the cube corner element are compound.

14. The geometric structure of claim 5, wherein the machined portion and the non-machined portion are substantially coplanar.

15. The geometric structure of claim 8, wherein the compound face terminates at a nondihedral edge of the cube corner element, and wherein the transition line is nonparallel to the nondihedral edge.

16. A cube corner element having three faces and a cube height of no greater than about 1 mm, at least two of the three faces each terminating at a nondihedral edge of the cube corner element, and each of the at least two faces comprising two constituent faces disposed on opposed sides of a transition line that is nonparallel to the respective nondihedral edge, said faces having angular orientations that differ by less than 10 degrees of arc.

17. The cube corner element of claim 16, wherein each of the three faces terminate at a nondihedral edge of the cube corner element, each of the three faces comprising two constituent faces disposed on opposed sides of a transition line that is nonparallel to the respective nondihedral edge.

18. The cube corner element of claim 16, wherein all of the transition lines are parallel to a reference plane.

19. The cube corner element of claim 16, wherein, for at least one of the at least two faces, one of the two constituent faces has a machined surface and the other of the two constituent faces has a non-machined surface.

20. A cube corner article having a structured surface comprising a plurality of cube corner elements as set forth in claim 16.

21. The cube corner article of claim 20, wherein all of the transition lines are parallel to a reference plane.

22. The cube corner article of claim 20, wherein the plurality of cube corner elements comprise PG cube corner elements.

23. The cube corner article of claim 20, wherein the cube corner elements comprise matched pairs of cube corner elements.

24. The cube corner article of claim 20, wherein the cube corner article comprises retroreflective sheeting.

25. The cube corner article of claim 21, wherein the cube corner article comprises retroreflective sheeting.

26. The cube corner article of claim 22, wherein the structured surface comprises cube corner pyramids and cube corner cavities.

27. An array of neighboring cube corner elements each having three faces, wherein, for each corner cube element in the array:
   at least one of the three faces terminates at a nondihedral edge of such cube corner element; and
   the at least one face comprises two constituent faces disposed on opposed sides of a transition line that is nonparallel to the nondihedral edge said faces having angular orientations that differ by less than 10 degrees of arc.

28. The array of claim 27, wherein the cube corner elements define a reference plane, and wherein each transition line in the array is substantially parallel to the reference plane.

29. The array of claim 27, wherein the at least one face comprises two of the three faces.

30. The array of claim 27, wherein the at least one face comprises all three faces.

31. A cube corner article having a structured surface comprising the array of neighboring cube corner elements as set forth in claim 27.

32. The cube corner article of claim 27, wherein the cube corner article comprises retroreflective sheeting.

33. The cube corner article of claim 27, wherein the cube corner elements each have a cube height no greater than about 1 mm.

34. A cube corner article having a structured surface comprising the array of neighboring cube corner elements as set forth in claim 29, and further wherein each transition line in the array is substantially parallel to a common reference plane.

35. The cube corner article of claim 31, wherein the cube corner article comprises retroreflective sheeting.

36. The cube corner article of claim 34, wherein the cube corner article comprises retroreflective sheeting.

* * * * *

UNITED STATES PATENT AND TRADEMARK OFFICE
CERTIFICATE OF CORRECTION

PATENT NO. : 6,540,367 B1
DATED : April 1, 2003
INVENTOR(S) : Benson, Gerald M.

It is certified that error appears in the above-identified patent and that said Letters Patent is hereby corrected as shown below:

<u>Title page,</u>
Item [56] U.S. DOCUMENTS, add the following references

| | | | | |
|---|---|---|---|---|
| -- 4,095,773 | 06/20/73 | Lindner | 249 | 117 |
| 4,149,304 | 04/17/79 | Brynjegard | 29 | 148 |
| 4,588,258 | 05/13/86 | Hoopman | 350 | 103 |
| 4,601,861 | 07/22/86 | Pricone et al. | 264 | 1.6 |
| 4,775,219 | 10/04/88 | Appeldorn et al. | 350 | 103 |
| 4,798,178 | 01/17/89 | Greulich et al. | 123 | 90.6 -- |

<u>Column 6,</u>
Line 20, delete "infra" and insert in place thereof -- *infra* --.

<u>Column 7,</u>
Line 10, delete "substantially" and insert in place thereof -- substantially --.
Line 18, delete "infra" and insert in place thereof -- *infra* --.

<u>Column 8,</u>
Line 42, delete "infra" and insert in place thereof -- *infra* --.
Line 51, delete "pyramide" and insert in place thereof -- pyramids --.
Line 52, delete "trianglar" and insert in place thereof -- triangular --.

<u>Column 17,</u>
Line 44, delete "threesided" and insert in place thereof -- three-sided --.

<u>Column 19,</u>
Line 24, after "and" insert -- I --.
Line 32, delete "e" and insert in place thereof -- I --.

<u>Column 21,</u>
Line 19, after "Pricone" insert -- et al. --.

<u>Column 22,</u>
Line 37, delete "polyamids" and insert in place thereof -- polyamides --.
Line 51, delete "polybutryate" and insert in place thereof -- polybutyrate --.

UNITED STATES PATENT AND TRADEMARK OFFICE
CERTIFICATE OF CORRECTION

PATENT NO.     : 6,540,367 B1
DATED          : April 1, 2003
INVENTOR(S)    : Benson, Gerald M.

It is certified that error appears in the above-identified patent and that said Letters Patent is hereby corrected as shown below:

Column 26,
Line 7, delete "corner cube" and insert in place thereof -- cube corner --.
Line 13, after the word "edge" insert -- , --.
Line 27, delete "comprises retroreflective sheeting" and insert in place thereof -- comprise matched pairs of cube corner elements --

Signed and Sealed this

Fourteenth Day of October, 2003

JAMES E. ROGAN
*Director of the United States Patent and Trademark Office*